(12) United States Patent
Reynolds et al.

(10) Patent No.: US 10,225,224 B1
(45) Date of Patent: Mar. 5, 2019

(54) WEB AND VOICE MESSAGE NOTIFICATION SYSTEM AND PROCESS

(71) Applicant: PRIORITY REPLY NETWORKS, LLC., West Hollywood, CA (US)

(72) Inventors: Scott D. Reynolds, West Hollywood, CA (US); David L. Finke, West Hollywood, CA (US)

(73) Assignee: PRIORITY REPLY NETWORKS, LLC, West Hollywood, CA (US)

( * ) Notice: Subject to any disclaimer, the term of this patent is extended or adjusted under 35 U.S.C. 154(b) by 329 days.

(21) Appl. No.: 14/967,004

(22) Filed: Dec. 11, 2015

Related U.S. Application Data

(60) Provisional application No. 62/090,828, filed on Dec. 11, 2014.

(51) Int. Cl.
*H04L 12/58* (2006.01)
*G06Q 10/10* (2012.01)
*G08B 25/00* (2006.01)

(52) U.S. Cl.
CPC .............. *H04L 51/24* (2013.01); *H04L 51/22* (2013.01); *H04L 51/26* (2013.01); *H04L 51/30* (2013.01); *G06Q 10/10* (2013.01); *G08B 25/005* (2013.01); *H04L 51/14* (2013.01); *H04L 51/34* (2013.01)

(58) Field of Classification Search
CPC ....... H04L 51/00; H04L 51/04; H04L 51/043; H04L 51/046; H04L 51/14; H04L 51/22; H04L 51/24; H04L 51/26; H04L 51/30; H04L 51/34; H04L 51/38; G08B 25/005; G06Q 10/10; G06Q 10/107
See application file for complete search history.

(56) References Cited

U.S. PATENT DOCUMENTS

| | | | |
|---|---|---|---|
| 9,866,464 B1* | 1/2018 | Miltenberger | H04L 51/24 |
| 9,996,666 B1* | 6/2018 | Wilson | G06Q 10/1095 |
| 2004/0172284 A1* | 9/2004 | Sullivan | G06Q 10/10 705/2 |
| 2005/0135593 A1* | 6/2005 | Becerra | H04M 3/5166 379/220.01 |
| 2006/0049936 A1* | 3/2006 | Collins, Jr. | G08B 25/005 340/539.11 |

(Continued)

*Primary Examiner* — Vivek Srivatava
*Assistant Examiner* — William C McBeth
(74) *Attorney, Agent, or Firm* — Lowenstein Sandler LLP

(57) ABSTRACT

Embodiments of a system and process disclosed herein, provide a service platform that enables data exchange between requesters and providers. One embodiment comprises a computer implemented method including: forming a request at a requester device; transmitting the request to a message device; generating a request message; determining a primary provider entity to service the request message; and transmitting a notification of the request message to a first provider device; in response to an indication that the first provider device received the notification within a time period: transmitting the generated request message to the first provider device; generating a request message reply; and transmitting the request message reply to the requester device; in response to an indication that the first provider device did not receive, or respond to, the notification within the time period: determining a second provider entity as the failover provider entity; transmitting the request message to a second provider device associated with the failover provider entity; generating a request message reply; and transmitting the request message reply to the requester device.

11 Claims, 34 Drawing Sheets

(56) References Cited

U.S. PATENT DOCUMENTS

| | | | | |
|---|---|---|---|---|
| 2006/0168049 A1* | 7/2006 | Orozco | H04L 51/04 | 709/206 |
| 2006/0248147 A1* | 11/2006 | Hill | G06Q 10/107 | 709/206 |
| 2007/0013511 A1* | 1/2007 | Weiner | G08B 25/005 | 340/539.12 |
| 2008/0063154 A1* | 3/2008 | Tamari | H04M 11/04 | 379/88.13 |
| 2008/0114712 A1* | 5/2008 | Gleim | G06Q 10/06 | 706/47 |
| 2009/0049151 A1* | 2/2009 | Pagan | H04L 51/04 | 709/207 |
| 2013/0117391 A1* | 5/2013 | Aceves | H04L 51/30 | 709/206 |
| 2014/0236635 A1* | 8/2014 | Liberty | G06F 19/322 | 705/3 |
| 2014/0320281 A1* | 10/2014 | Sager | G08B 25/005 | 340/501 |
| 2015/0019654 A1* | 1/2015 | Wheeler | H04L 51/24 | 709/206 |
| 2015/0035675 A1* | 2/2015 | Gunaratnam | G08B 21/02 | 340/573.1 |
| 2015/0173674 A1* | 6/2015 | Hayes | A61B 5/681 | 600/301 |
| 2015/0302538 A1* | 10/2015 | Mazar | G06Q 10/10 | 705/2 |
| 2015/0350148 A1* | 12/2015 | Kenney | H04L 51/24 | 709/206 |
| 2016/0125725 A1* | 5/2016 | Sager | G08B 25/005 | 340/502 |
| 2016/0132816 A1* | 5/2016 | Lush | G06Q 10/063112 | 705/7.14 |
| 2016/0323210 A1* | 11/2016 | Yoakum | H04L 51/04 | |
| 2018/0150606 A1* | 5/2018 | Arabi | G16H 10/60 | |

* cited by examiner

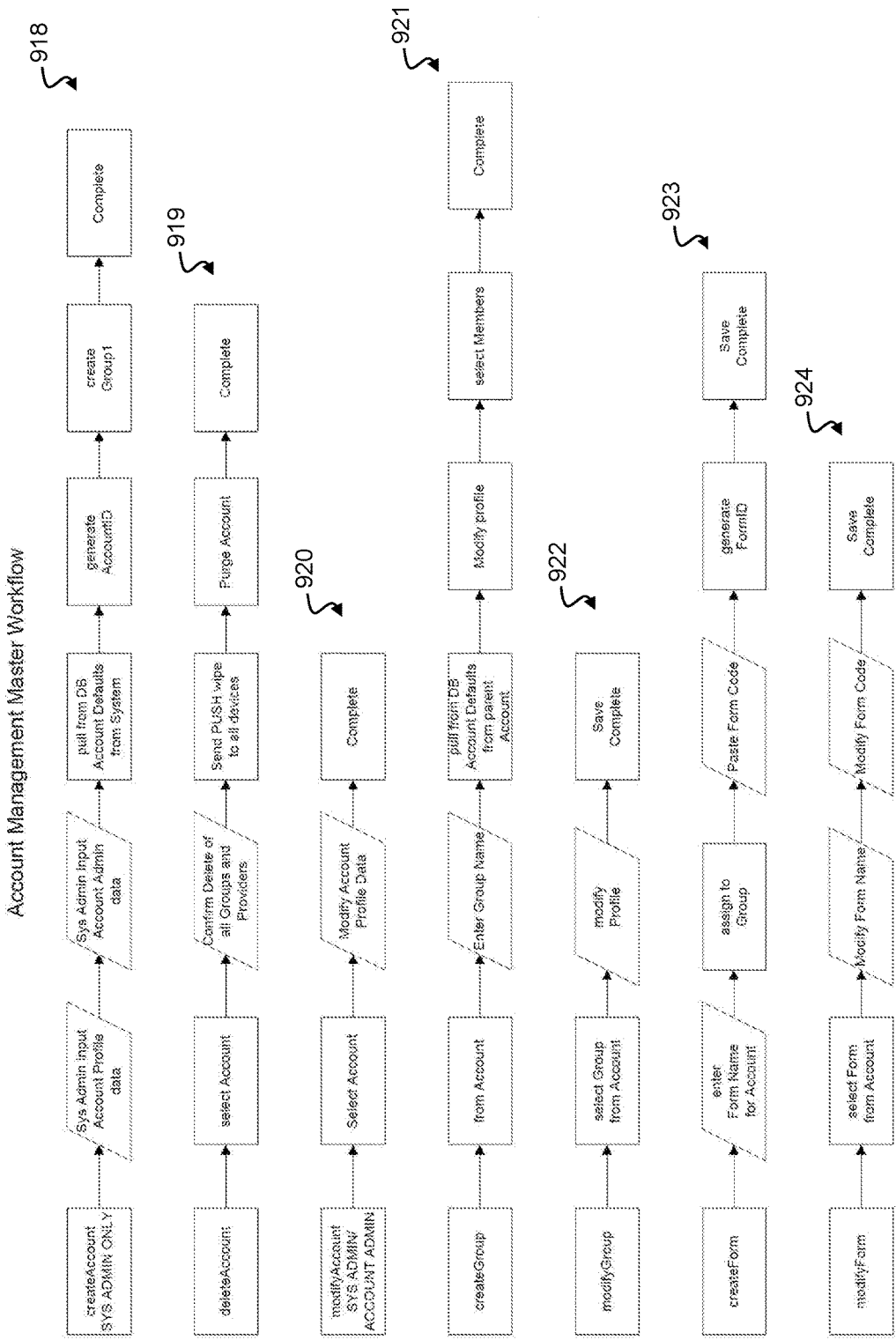

Thank you for your message

Keep this page open to monitor your message progress

Non-urgent messages will be responded to within 3 hours between 9am and 9pm. Urgent messages will be responded to within 60 minutes.

Your message has been received

Your Message ID:
25250FA1FF11A2E956FA6CAA3FEB5751

Patients Web Browser

○○○○○ 🛜   9:41 AM   ✈ ✱ 🔋
Back   Message Detail   Menu

URGENT MESSAGE

Patient Name
Julie Smith

Primary Care Physician
Dr. Dorothy Stanley

Date of Birth
Jul 1, 1981

Patient Mobile Callback Number      ✎
(323) 233-2323

Immediate Callback Requested
Yes

Is patient pregnant or trying?
No

Patient Request
I'm leaving in the morning and need my prescription refilled.

Assign                              Notate

Providers Smart Phone

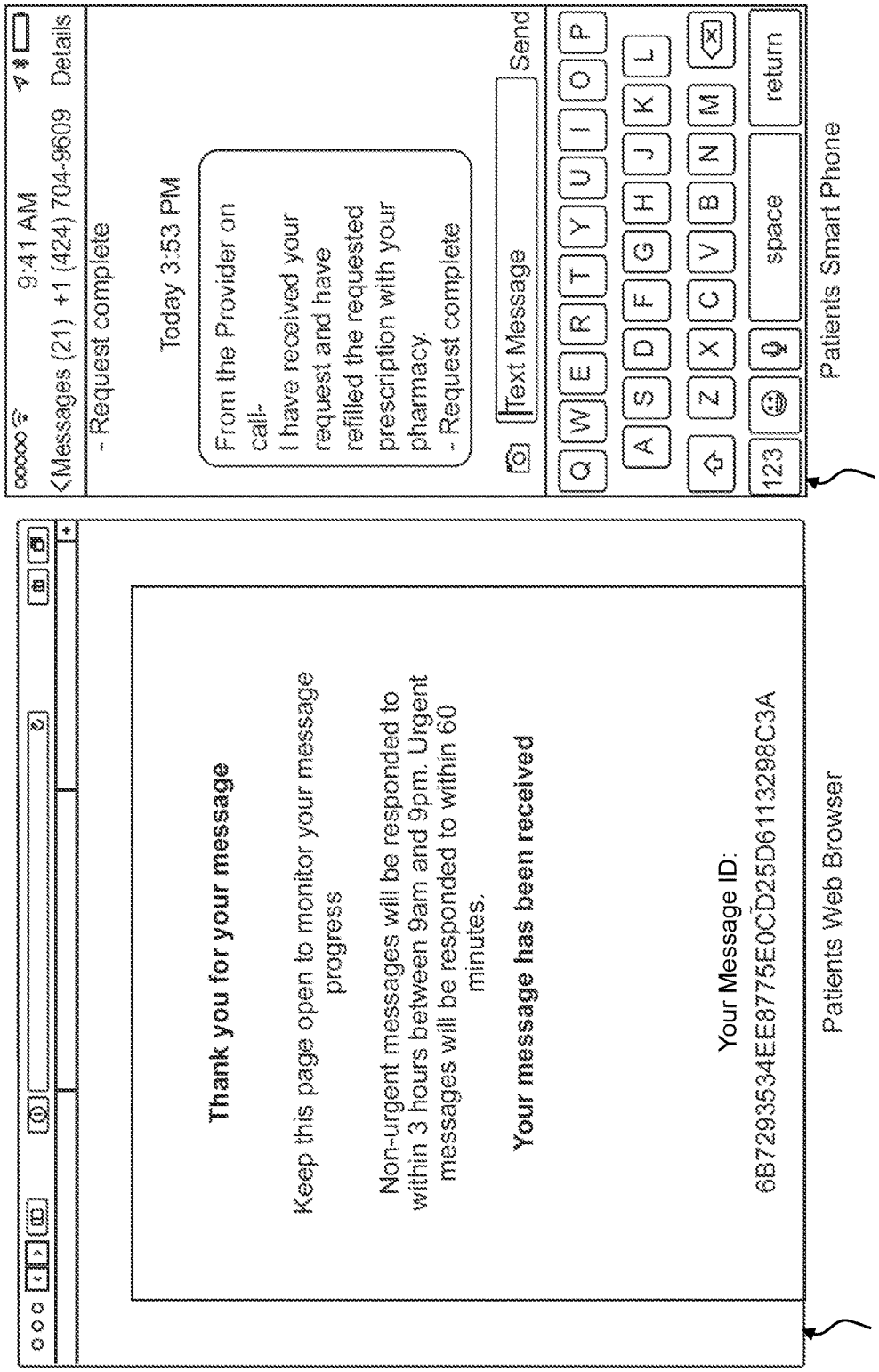

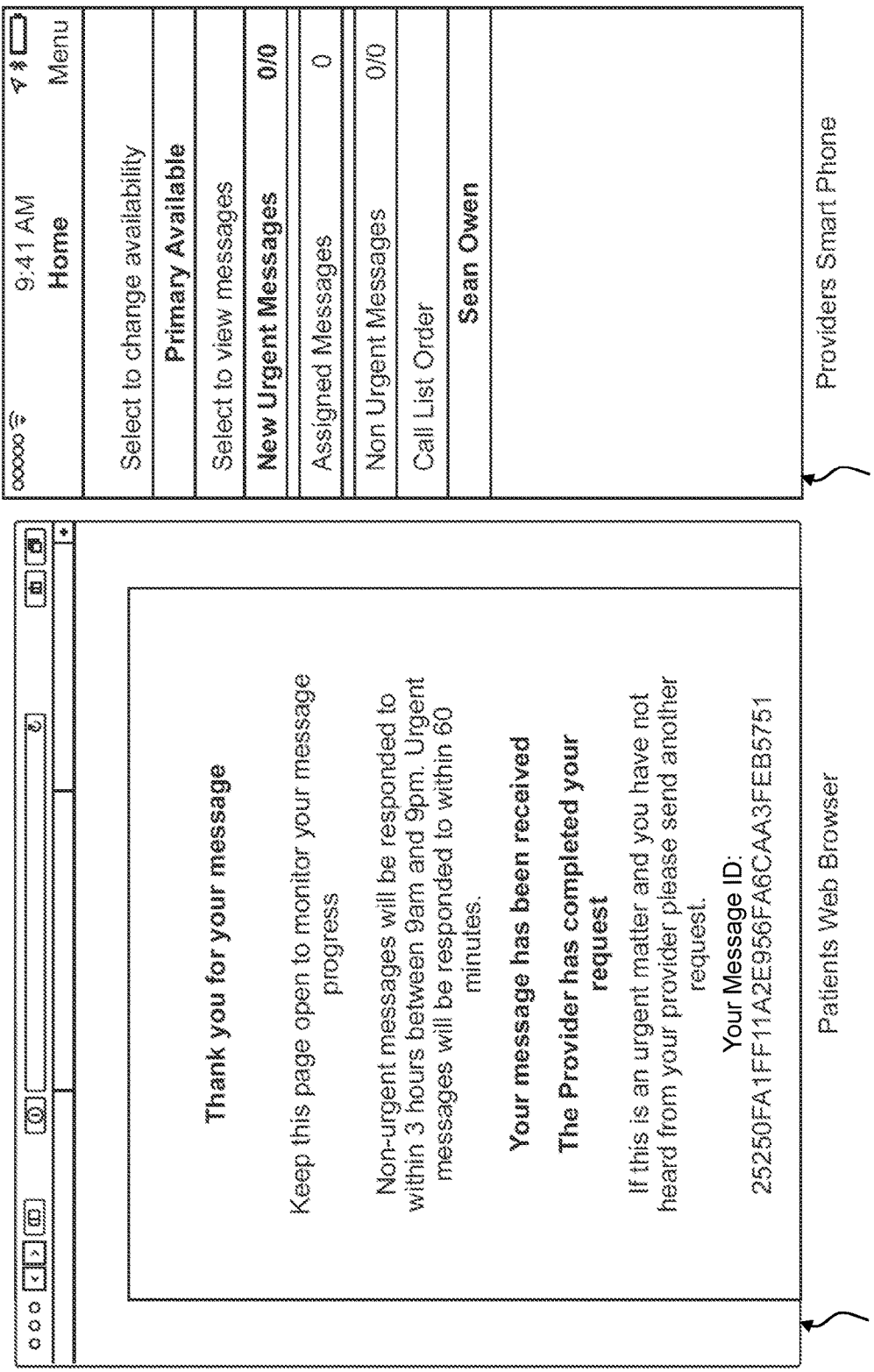

FIG. 20

Hi, Mary Winslow

Logout
Welcome back!
(Admin)

- Account Info
- Messages
- Groups
- Users
- Forms
- Templates
- List Order
- Settings
- System Logs Select Group [Pacific Women's (DEMO)]

Account Management

| Full Name | Email | Role | New | Read | Assigned | Completed | Action |
|---|---|---|---|---|---|---|---|
| Sean Owen | callsimplified+seanowen@gmail.com | Provider | 0 | 0 | 0 | 6 | ☑ ☒ ⟳ |
| Dorothy Stanley | callsimplified+dorothy@gmail.com | Provider | 0 | 0 | 0 | 0 | ☑ ☒ ⟳ |
| Mary Winslow | callsimplified+mary@gmail.com | Admin | 0 | 0 | 0 | 0 | ☑ ☒ |

Urgent: 0  Non-Urgent: 0  Assigned: 0
Urgent Wait Max: No Message Pending.

WEB AND VOICE MESSAGE NOTIFICATION SYSTEM AND PROCESS

CROSS-REFERENCE TO RELATED APPLICATION

This application claims benefit under 35 U.S.C. § 119(e) of U.S. Provisional Patent Application Ser. No. 62/090,828 filed on Dec. 11, 2014, incorporated herein by reference.

FIELD OF THE INVENTION

This invention relates generally to message notification, and in particular to voice and internet message notification.

DESCRIPTION OF RELATED ART

Web sites that use email and chat require a live person be involved in the communication, causing either no immediate reply or the inability for a service provider to respond appropriately with the number of incoming requests. Voicemail services often collect inaccurate data due to inaudible recordings or missing critical information. Manual intervention is needed when providers do not respond to conventional methods of notification. Alternatively, a live operator system may not document accurately, involve multiple redundant steps and are costly.

BRIEF SUMMARY OF THE INVENTION

Embodiments of a system and process disclosed herein, comprise a service platform that enables data exchange between requesters and providers. An exemplary computer implemented method embodiment comprises: forming a request at a requester device having a processor and a requester client module configured to receive requests; transmitting the request from the requester client module to a message device having a processor and a messaging service module configured to process requests; generating at the messaging service module, a request message based on the request; determining at the messaging service module, a primary provider entity to service the request message; and transmitting from the message device, a notification of the request message to a first provider device associated with the primary provider entity, first provider device having a processor and a provider client module configured to process the notification; in response to an indication that the first provider device received the notification within a time period: transmitting from the messaging service module, the generated request message to the first provider device, or intermediary external service providers/gateways subscribed to the request (or response); generating at the first provider device, a request message reply; and transmitting from the first provider device, the request message reply to the requester device; in response to an indication that the first provider device did not receive, or respond to, the notification within the time period: determining at the messaging service module, a second provider entity as the failover provider entity; transmitting from the message device, the request message to a second provider device associated with the failover provider entity, the second provider device having a processor and a provider client module configured to process requests; generating at the second provider device, a request message reply; and transmitting from the second provider device, the request message reply to the requester device.

In additional exemplary computer implemented method embodiments, the formed request includes an urgency level, and the time period may be based on the urgency level. In additional exemplary computer implemented method embodiments, forming the request may further include: determining one or more attributes of a requestor; and requesting one or more content from the requestor. In additional exemplary computer implemented method embodiments, the one or more attributes of the requestor may include at least one of: a requestor location, a requestor profile, a requestor phone number, a requestor name, and a requestor date of birth. In additional exemplary computer implemented method embodiments, the transmitted notification may be one or more of: a Short Message Service (SMS) text message and a call playing a pre-recorded message. In additional exemplary computer implemented method embodiments, the generated request message reply may be one or more of: a Short Message Service (SMS) text message and a call to the requester device. In additional exemplary computer implemented method embodiments, in response to the indication that the requester device has not received the reply to the request message from the first provider device within the reply time period: setting at the message device, the second provider entity as the primary provider entity; transmitting from the message device, the request message to the second provider device; generating at the second provider device, the request message reply; and transmitting from the second provider device, the generated request message reply to the requester device.

In additional exemplary computer implemented method embodiments, in response to the indication that the first provider device received the notification within the time period: transmitting from the messaging service module, the generated request message to one or more external service provider devices, where the one or more external service provider devices are subscribed to the request. In additional exemplary computer implemented method embodiments, in response to the indication that the first provider device received the notification within the time period: transmitting from the first provider device, the request message reply to one or more external service provider devices, where the one or more external service provider devices are subscribed to the request message reply. In additional exemplary computer implemented method embodiments, in response to the indication that the first provider device did not receive, or respond to, the notification within the time period: transmitting from the message device, the generated request message to one or more external service provider devices, where the one or more external service provider devices are subscribed to the request. In additional exemplary computer implemented method embodiments, in response to the indication that the first provider device did not receive, or respond to, the notification within the time period: transmitting from the second provider device, the request message reply to one or more external service provider devices, where the one or more external service provider devices are subscribed to the request message reply.

Exemplary computer implemented method embodiments, also include: setting at a data publisher device having a processor and a data publisher component, a data sharing authorization level; linking at the data publisher component, one or more health devices to the data publisher component; transmitting from the linked one or more health devices, raw health data to the data publisher component; transmitting from the data publisher component, raw health data from the linked one or more health devices to a service platform device having a processor and a service platform component based on the set data sharing authorization level; transmitting from the service platform component, the raw health data to a data subscriber device having a processor and a data subscriber component; and receiving at the service platform component, processed health data based on the raw health data from the data subscriber component.

Additional exemplary computer implemented method embodiments include: accessing by the data publisher component, the processed health data from the service platform component. Additional exemplary computer implemented method embodiments may include: accessing by one or more data subscriber devices having a processor and the data subscriber component, the processed health data from the service platform component.

These and other features, aspects and advantages of the present invention will become understood with reference to the following description, appended claims and accompanying figures.

BRIEF DESCRIPTION OF THE DRAWINGS

FIG. 9A shows a functional block diagram of a system and process for an account management master workflow as disclosed herein, according to an embodiment;

FIGS. 13A-13B illustrate a GUI display of a patient web browser and provider smart phone after a message has been sent by the requester and viewed by the provider, according to one embodiment;

FIGS. 15A-15B illustrate a GUI of a patient's web browser and a patient smart phone showing that a message has been received by the provider, according to one embodiment;

FIGS. 16A-16B illustrate a GUI of a patient web browser and a provider smart phone after the request has been completed, according to one embodiment;

FIG. 20 illustrates a web browser view of form creation and form editing used by the provider or office staff, according to one embodiment;

FIG. 21 illustrates a web browser view of group management used by the provider or office staff, according to one embodiment.

DETAILED DESCRIPTION

Figure 1:
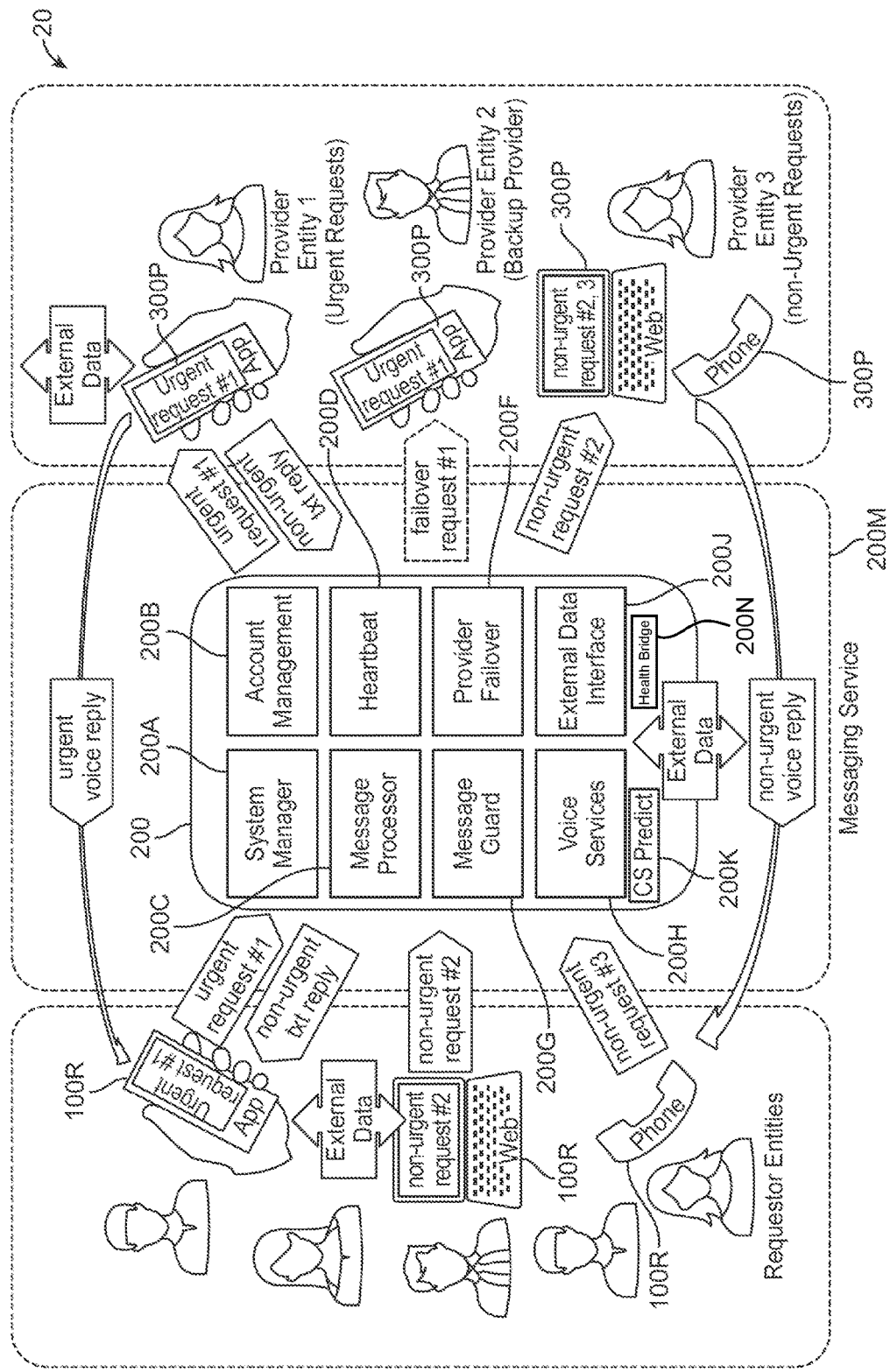
FIG. 1 shows a block diagram of a notification system and process disclosed herein, according to one embodiment.

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Embodiments of a system and process disclosed herein, provide a service platform that enables data exchange between requesters and providers. Embodiments of a web (internet) based and voice message notification system and process disclosed herein, provide a web and voice message platform that ensures incoming request messages are received, prioritized and assigned to appropriate recipient providers. Embodiments provide a failsafe, low resource consumption mechanism to verify that a messaging application of a recipient is receiving messages, and provide automatic failover to alternate recipients if the messaging application becomes unreachable or incoming messages are not responded to. Embodiments provide a messaging application that can augment incoming message requests with location specific data, access to internally designed and external data augmentation sources (e.g., health bridge) to aid the recipient of the message in performing their task, and provide a direct advertising serving platform to the target sender and receiver.

Embodiments enable users with time sensitive and urgent needs to utilize the internet (e.g., web site) to request services and be assured that the requests are received and tracked, and utilize an automated service that ensures the service provider is notified electronically and responds to the request in the allotted time period including tracking of all steps in the communication process.

Additionally, embodiments provide the opportunity to sell advertisements, which directly relate to the user in need of a service, or a service provider. This serves as an extension to access the user location, recent web searches, and other application data to better serve their request.

In an example embodiment disclosed herein, a requester (requestor) entity includes organizations, individuals and/or systems requesting a particular service. A provider entity (or provider service) includes organizations, individuals and/or systems that provide a service in response to such a request. A messaging service includes systems that facilitate providing a service from a provider entity to a requester entity.

Embodiments of a notification system including a hardware platform, software application (app), web and voice messaging service and process are disclosed herein. One embodiment provides an app, web and telephony message delivery and tracking service guaranteeing requester entities having needs are responded to by service provider entities based on prioritized urgency and both provider entities and provider clients availability.

One embodiment provides an app, web and voice messaging service that essentially guarantees incoming messages from requester entities via requester clients are received, prioritized and assigned to appropriate recipient provider clients and subsequently provider entities. One embodiment provides a failsafe, low power consumption system to verify a provider client (messaging application or messaging app) is receiving messages and provides automatic failover to alternate provider client recipients if the provider client becomes unreachable due to network connectivity problems or a received message is not responded to by the provider entity.

Both the requester client and provider client messaging app can augment message requests with location specific data, access external data sources to aid the requester entity or provider entity in performing their tasks such as accessing online references, and provide a direct ad serving platform to target sender and receiver.

One embodiment enables requester entities having time sensitive or urgent needs to use a web browser to request service and be assured that the requests are received by intended provider entities via the provider client (e.g., service providers such as a medical service provider) and tracked, and to provide an automated service that ensures the provider entity is notified electronically and responds to the request in the allotted time period including logging of all communications.

One embodiment enables a request or entity to use telephone direct dialing where the requester can select touch tone digits or voice recognition to enter pertinent data and direct the requester to the right voice message area (e.g., press 1 for Urgent. Enter your birthdates or ID number). The incoming request can either be directed directly to the provider entities registered phone number or a voice message can be recorded where a new message will be created in the Messaging Service Module and the appropriate provider client and entity will be notified.

One embodiment enables a revenue stream by providing an opportunity to publish anonymous metadata about health data, allows health data analytics or prevention information to be provided to the requester or provider, or sell ads, which directly relates to the requester or the provider entity specific needs (e.g., discount for pharmacy prescription or supplemental products). This serves as an extension to access the requester or provider client location, recent web searches, and other app data to better serve the client request.

FIG. 1 shows a functional block diagram of an overall service system 20 and process disclosed herein, according to an embodiment. The system 20 comprises at least a messaging service system 200, and involves one or more requester entities 100R, and one or more provider entities 300P.

In one embodiment, the messaging service module 200 is implemented on a computing system 200M which can include one or more computing systems or networked computing systems such as a computing cloud. As such, in one embodiment, the system 20 comprises a distributed computing system, wherein functionality of the disclosed method is implemented across multiple computing platforms (e.g., computing devices 100R, 200M, 300P). In one embodiment, the devices in the system 20 utilize one more communication networks such as wired/wireless, cellular and internet for message and information communication.

Figure 1A:
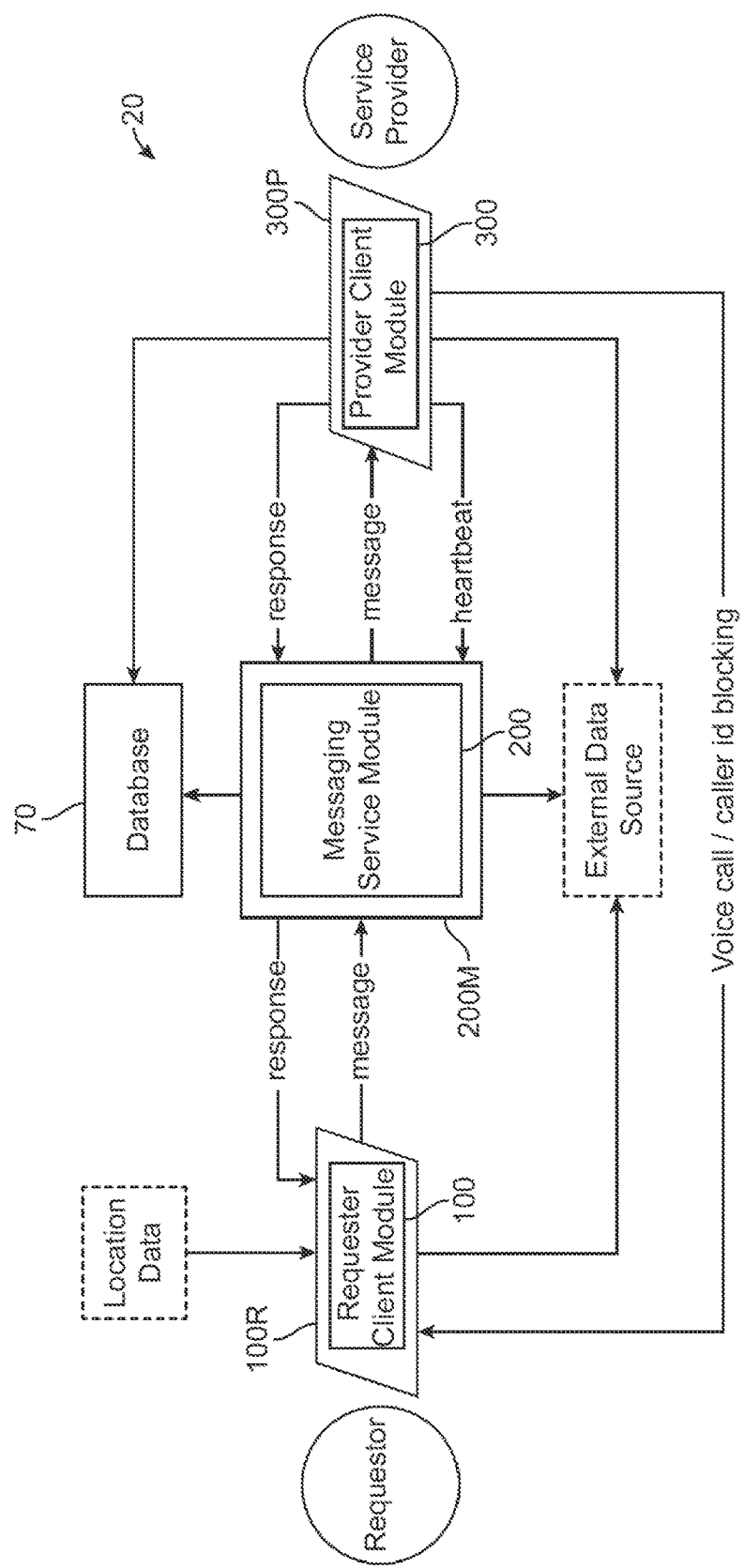
FIG. 1A shows another block diagram of the notification system of FIG. 1, according to one embodiment.

FIG. 1A shows a functional block diagram of a version of the system 20, illustrating message process flow, according to an embodiment. The system 20 includes a requester client module 100 implemented in the requester device 100R, and a provider client module 300 implemented in the provider device 300P. In one embodiment, each requester device 100R implements a requester client module 100, and each provider device 300P implements a provider client module 300.

As such, in one embodiment, the message service system 20 operates according to the functionality of the Requester Client module 100 (e.g., App, web or phone), the Messaging Service module 200, and the Provider Client module 300 (e.g., App, web or phone), described in more detail herein below.

In one embodiment, the Requester Client module 100 provides functionality including allowing creating of new message requests and sending the messages for processing and response by service providers.

In one embodiment, the Messaging Service module 200 provides functionality including management of system parameters and security, management of account and device security, receiving and confirming messages, tracking messages, alerting service providers of messages.

In one embodiment, the Provider Client module 300 receives request messages and enables a Provider to view, manage and reply to messages and further manage Provider notification preferences and availability.

Figure 2:
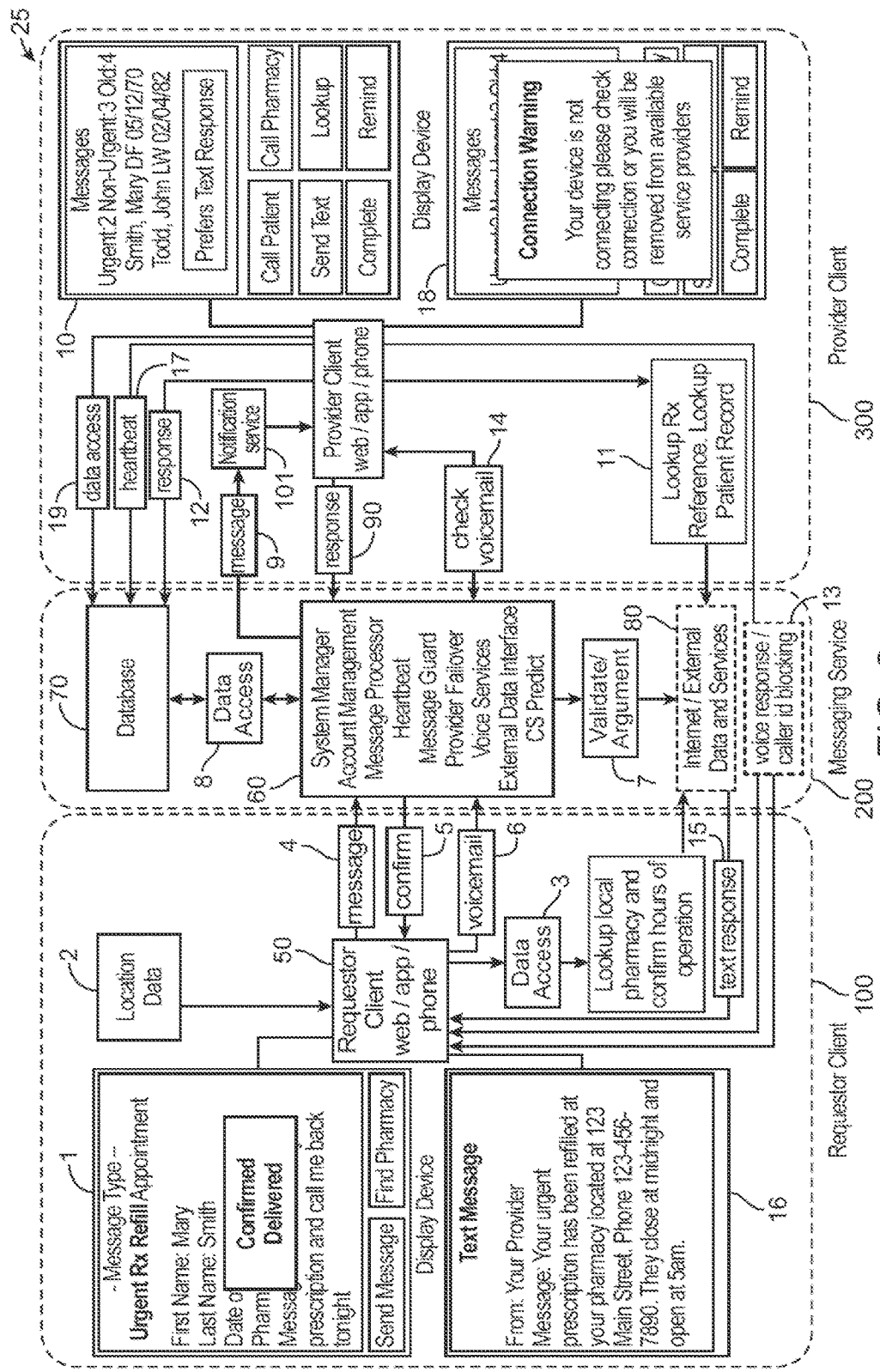
FIG. 2 shows a process flow and system module interaction for message processing in the notification system, according to one embodiment.

FIG. 2 shows a block diagram of the message service system 20 of FIGS. 1 and 1A. FIG. 2 further shows a process flow 25 for the lifecycle of a message in the message service system 20 of FIGS. 1 and 1A, and illustrates interaction between system modules depicted therein, described further below.

In one embodiment, the messaging service module 200 includes a service module 60 which comprises a system manager module, a message processor module, a message guard module, a voice services module, an account management module, a heartbeat module, a provider failover module and an external data interface module (FIG. 1).

A provider entity utilizes the Provider Client module 300 which includes a provider client 90 comprising an executable module (e.g., browser application, mobile application, etc.) implemented on a computing device 300P (e.g., computer system, mobile device such as a smart phone, tablet) to respond to service requests from a requester entity, via the messaging service module 200. A requester entity utilizes the requester Client module 100 which includes a requester client 50 comprising an executable module (e.g., browser application, mobile application, etc.) implemented on a computing device 100R (e.g., computer system, mobile device such as a smart phone, tablet) to make service requests from a provider entity, via the messaging service module 200.

The requester client function 50 (e.g., application module) such as a web, app or mobile device), allows new message requests to be created by a Requester entity and sent to the Message Processor module 200C in the Messaging Service module 200. An example message includes user/client options such as name, phone number, date of birth, message, location data, or metadata (e.g., device pre-stored items from a request or medical history). The Requester Client module 100 can further lookup information (e.g., on the Internet or using an External Data and Services module) to augment the Requester Client entity data such as a pharmacy closing hours based on a patient entering the pharmacy phone number or determining the pharmacy based on the patient phone number and date of birth.

A requester entity such as a person or process wishing to send a request message to a service provider uses the Requester Client module 100 (e.g., implemented as a web browser or mobile application) to enter the message data. Utilizing user location data (e.g., using a location service such as GPS, existing user location data, etc), a database may be accessed to determine local resources (such as pharmacy) to satisfy the request, and lookup address and hours of operation before the message is sent. If a web browser or mobile app is not the input method, a user can leave a voicemail with the system, wherein the Requester Client module 100 collects pertinent user information creates a request and handled the same as a web or app message.

The Requester Client module 100 can also use the location date to determine location of the user device (e.g., mobile electronic device, computer) to access locally available services that may be referenced by a service provider.

The request message is sent to the system Message Handler of the Message Processor module 200C for processing.

Message receipt is confirmed by the Message Processor module and delivered to the Provider Client module 300 (e.g., provider mobile electronic device, provider office computing system, etc.). Information communication such as message and response exchanges between various modules may take place via Internet or other communication networks, and via wired or wireless systems. Further, voice communication can take place using cellular networks (e.g., cell phone) or phone landlines or Internet (e.g., VoIP, Skype, etc.)

Request messages received at the Provider Client module 300 may be validated or enhanced with more specific stored information through interaction with internet and external data services.

Message and enhancements are stored in a message database 70 for access by a service provider such as via web browser and/or mobile app devices such as smart phones.

Message notification is sent via device push notification service where the provider device (e.g., provider mobile device such as smart phone) is listening for low power alerts.

The service provider device is alerted to a request message based on priority, wherein the Provider Client module 300 retrieves messages from the message database, whereby messages are displayed and provider has various options in responding to the request message, such as by text and voice, and to manage the state of the message for reminders and completion.

The provider device can lookup data from external sources by voice or network communication.

The provider reply is sent to the Messaging Service module 200 where it is handled, including for example:
  A voice call to the requester device (e.g., user mobile phone) where the system tracks the interaction;
  A text reply is sent from the Messaging Service module 200 to the requester device;
  And the request message sender can get the alert and read the reply.

An optional heartbeat service provides a failsafe for said push notification service to the provider client to ensure the provider device is receiving messages from the Messaging Service module 200 without requiring the provider device to continually poll the message database 70 and consume resources.

If the provider device does not receive the heartbeat signal and is not able to contact the Messaging Service module 200 in a predetermined interval, the service provider is notified until the delay is resolved and request messages have been sent to an alternate service provider.

Referring to FIG. 2, a more detailed description of the system and method disclosed herein is now provided.

In one embodiment, the Messaging Service module 200 comprises a Service module 60 which includes the following modules and functions:

A System Manager module 200A (FIG. 1) that provides system administration and settings of system wide parameters, creation of templates, forms, and account defaults to be used in provisioning new accounts for providers, system security, monitoring, external interface specification, and audit logging.

An Account Management module 200B (FIG. 1) that provides provisioning and management of service provider accounts and security settings. The Account Management module further provides access based controls for varying levels of account and message management functionality depending on role (e.g., Admin, Staff or Provider) providing least privileged access to service functions.

A Message Processor module 200C (FIG. 1) that receives and tracks incoming message requests from the Requester Client module 100 (e.g., a request or client web, app and external data calls such as automated requests from a electronic health records system) and assigns those requests to a provider client (via Provider Client module 300) based on urgency, priority and message type. The Message Processor module further ensures the messages are dispatched to the appropriate provider client, tracking time and optionally returning status of a request message to requester client. The Message Processor module further processes provider electronic replies sent back to Requester Client module 100.

A Heartbeat module 200D (FIG. 1) which includes two asynchronous components, one running on the Messaging Service module 200 and the other on the Provider Client module 300. Specifically, a Provider Client module Heartbeat component performs a check-in process with the message database 70 (i.e., Service database) on a pre-defined interval. Before a new message is sent to a determined Provider (via the Provider Client module 300), a Messaging Service module Heartbeat component confirms that an app check-in interval is less than a pre-defined Heartbeat and Failover interval.

A Message Guard module 200G (FIG. 1) that includes two backup monitoring components running on the Messaging Service module and the Provider Client module, respectively. Specifically, a Messaging Service module Message Guard component ensures that requester client messages that have been received by the Provider Client module 300 are responded to within a provider client interval selectable by the Provider (e.g., a service provider entity), before causing a Failover event and redistributing messages to a newly promoted provider client via the Provider Client module 300. The Message Guard Client module component operates independently with a separate, but related, provider entity selectable interval to remind the provider entity of requester messages that have not been responded to, thereby preventing the Service Message Guard module from initiating.

A Provider Failover module 200F (FIG. 1) that is triggered when either a failed Heartbeat event occurs, or Message Guard event occurs, causing the next provider client (i.e., secondary Provider) in an availability list to be promoted to the primary provider client available. The Failover module continues to advance secondary provider clients to primary availability based on the requester clients being available on the network and provider entities participating in the availability list.

A Voice Services module 200H (FIG. 1) that provides telephone service interface into the Messaging Service module using programmatic application programming interface voice over internet protocol services. In one implementation, requesters (e.g., patients in a healthcare application the system disclosed herein) call a phone number that allows data collection via touch tone entry or voice recognition, and can be directly connected to a provider entity registered phone number, or leave a voice message. The Message Processor module receives a notification of the voice message, requesters phone number, and data collected via touch tone (e.g., date of birth or indicate type of request) and distributes the message details to the Provider via the Provider Client module 300. The provider entity (i.e., Provider) can be connected with, view, listen, manage, and reply to the voice message using a combination of an application (e.g., a Provider App), text message or calling the requester on the phone. The provider entity may also allow the Provider App to dial the requester entity device (e.g., requesting user's smart phone) and when the requester answers, the Provider App dials the Provider entity device (e.g., service provider s smart phone) and connects the two parties in a virtual conference room to discuss the request, wherein the Provider entity need not share the Provider entity device private phone number with the requester. The provider entity can then make necessary notes in a provider client application message screen of the Provider Client module 300 and complete the request.

A CS Predict module 200K (FIG. 1) that enables a requester profile to be created on the requester user phone number or requester profile identification. One implementation includes allowing the Provider entity to be informed as to the most favorable response format for the requester user such as by voice phone call or by text message reply. The profile would score the number of requests a Requester entity (e.g., requester user such as a patent) makes per Provider entity response type (such as voice or text), and notify the provider in a display of the Provider Client App device 300P.

An External Data Interface module 200J (FIG. 1) which enables the Messaging Service module, the Requester Client module or the Provider Client module to interface with external data services such as location services, device stored data (e.g., user profiles, preferences, medical conditions, allergies, medications), online references links, integration with electronic health record systems, etc. A requester client (Requester entity) can send a message with location data, wherein the Messaging Service module can look up more user record information (e.g., in a health application, from an Electronic Health Records system) and the Provider entity receives the message with this additional information. The Provider entity by way of the provider client module 300 can then access external references, medical searches, etc., and respond to the request more fully. The Messaging Service module can then record the response back into the EHR system upon completion of the message task.

A Database module 70 which may be external to the main Service module 60, allows high availability and global scalability. The Messaging Service module, Requester Client module and Provider Client module may interact directly and securely with the Database module, which in one embodiment is an encrypted database. The database module stores the requester message and associated provider notation and reply to the requester. It also stores data related to the Provider devices and their availability to receive messages as well as all related data about accounts, preferences, configuration settings, etc.

In one embodiment, the Provider Client Module 300 comprises a mobile application and/or web device where new request messages are received from the Messaging Service module 200, whereby a Provider entity can view, manage and reply to messages and also manage their notification preferences and availability. The Provider Client module 300 internally can remind the Provider entity of messages that have not been responded to or completed with customized audible and visual notification (e.g., messages sent to service provider smart phone). Additionally, the Provider Client module may request message status data if it has not received an update from the Messaging Service within a specified Heartbeat interval in case of communication network congestion in the notification service.

As noted, FIG. 2 shows a process flow (flowchart) 25 for the operation of the service system 20 of FIGS. 1 and 1A, and illustrates interaction between system modules depicted therein. Specifically, FIG. 2 shows an embodiment of a process flow for the lifecycle of a message in the message service system 20 according to operation of the Requester Client module 100, the Messaging Service module 200 and the Provider Client module 300. The process flow 25 comprising the following processes (steps):

A requester entity (e.g., user) uses the requester client function 50 of the Request Client module 100, to create a message in a user interface such as a form provided by the Messaging Service of the service module 60 via the Message Processor module or via a voice service provided by the Voice Service module of the Messaging Service module 200 (process 1).

Optionally, available user location data is utilized in the message (process 2).

Location data 1 may be used to look up available resources such as pharmacy and lookup address and hours of operation before the message is submitted to the Message Processor module of the Messaging Service module 200 (process 3).

Message is sent to the Message Processor module of the Messaging Service module 200 (process 4).

Message receipt is confirmed by the Message Processor module and optionally delivered to requester client function 50, such as "Confirmed Delivered" (process 5).

If the requester client function 50 (e.g., web or mobile app) is not the input method, the user can dial a phone number, input data collection elements via touch tone such as date of birth, call back number, or other numeric data collection options and or leave a voicemail with pertinent information (process 6). A message is created by the Voice Service module of the Service module 60, indicating a voice message with available data elements collected via touch tone. Based on Provider entity preferences configured via a provider client function 90 of the Provider Client module 300, the call may be directly connected with a provider entities registered phone number and logged by the service Message Processor module of the service module 60 in the Database 70.

Messages received by the Message Processor module of the service module 60 may be validated or augmented with more specific dynamic information using the optional External Data Interface module 80 of the Messaging Service module 200 through interaction with internet and external data sources, such as verifying patient identity, adding patient history to message (process 7).

Message and augmented data are stored in the Database 70 which includes a message database, for access by the provider client function 90 of the Provider Client module 300 (process 8). In one embodiment, the provider client function 90 is implemented as provider client web, mobile app or a phone function.

The message processor module of the Service module 60 sends a message notification to the provider client function 90 implemented on a provider device (e.g., browser on a computer, mobile app on a smart phone) via a push notification service 101 (process 9). The push notification service can be e.g., Apple Push Notification Service or Google Notification Service. The provider client function 90 listens for messages using native device low power services.

The provider client function 90 of the service provider is alerted to an incoming message via the push notification service relative to message priority and message type and accesses the message data from the database 70 where the message is displayed on the provider device (process 10). The provider client function 90 provides various options in replying and documenting the message such as by text or voice and to manage the state of the message such as assign to other provider entities, set reminders and completion. The CS Predict module of the service module 60 can augment the request message with the predicted, preferred method of response from the Provider entity (e.g., voice, text).

The provider client function 90 of the Provider client device can optionally lookup data from external sources by the internet or voice using is native cellular and internet connection services (process 11).

The message reply is sent to the database 70 by the provider client function 90, and the Message Processor module of the service module 60 is notified of the message update (process 12).

A voice call from the provider client device (such as via the provider client function 90) using a phone, to the Requester Entity client function 50 is tracked by the Message Processor module of the service module 60 using provider client tracking touch tones on the service provider phone utilizing a phone user interface of the provider client function 90 and Voice Services module of the service module 60 (process 13). The connection from the Provider client device (e.g., provider smart phone) to the Requester client device (e.g., user smart phone) can be accomplished using traditional plain old telephone service or by the Voice Services module of the service module 60 initiating an anonymous call to the Requester client device, initiating a second call to the Requester client device and joining the Provider client device in a conference call obfuscating the Provider client device private caller identification information from the Requester client device.

Provider entity (e.g., service provider) selects voice messages in message lists displayed by the provider client function 90, wherein the provider client function 90 connects into the Voice Services module of the service module 60, allowing the service provider (e.g., a primary or secondary healthcare provider) to listen to and act upon the voice messages from requester (process 14). This also allows the provider entity to connect to the requester entity phone number automatically again.

A text reply can also be sent from the provider client function 90 via the Voice Service module of the service module 60 to the Requester Client function 50 (process 15).

If the provider client function 90 sends a text reply in response to the request message, the requester client function 50 receives an alert via the Voice Services module of the service module 60 and allows access and viewing of the reply (process 16).

The provider client function 90 provides a heartbeat service (described further below in relation to FIG. 3) sends a time update to the Database 70 to notify the Message Service module of the service module 60 of the last time the provider client function 90 has successfully connected to the communication network for communication with other modules/functions/devices (process 17).

A message guard service of the provider client function 90 monitors urgent messages that have not been responded to by providers and alerts a Provider entity (e.g., a primary service provider) to take action before a failover event occurs, causing the request message to be sent to provider client function 90 of an alternate service provider (process 18).

The message guard service of the service module 60 monitors messages that have been received by provider clients and not responded to in a defined (predetermined) interval, and triggers a provider failover service in the Provider Failover module of the service module 60 to initiate replacing the currently unavailable service provider client with an available provider client to receive the messages.

The database 70 is accessed (process 19) via a secure internet connection protocol that allows information to be written and retrieved. A provider client and the messaging service communicate with the database 70 directly, reducing the need for provider client and the messaging service to communicate with each other, which is not scalable or always possible do to available based on system design, availability and cost constraints.

Figure 3:
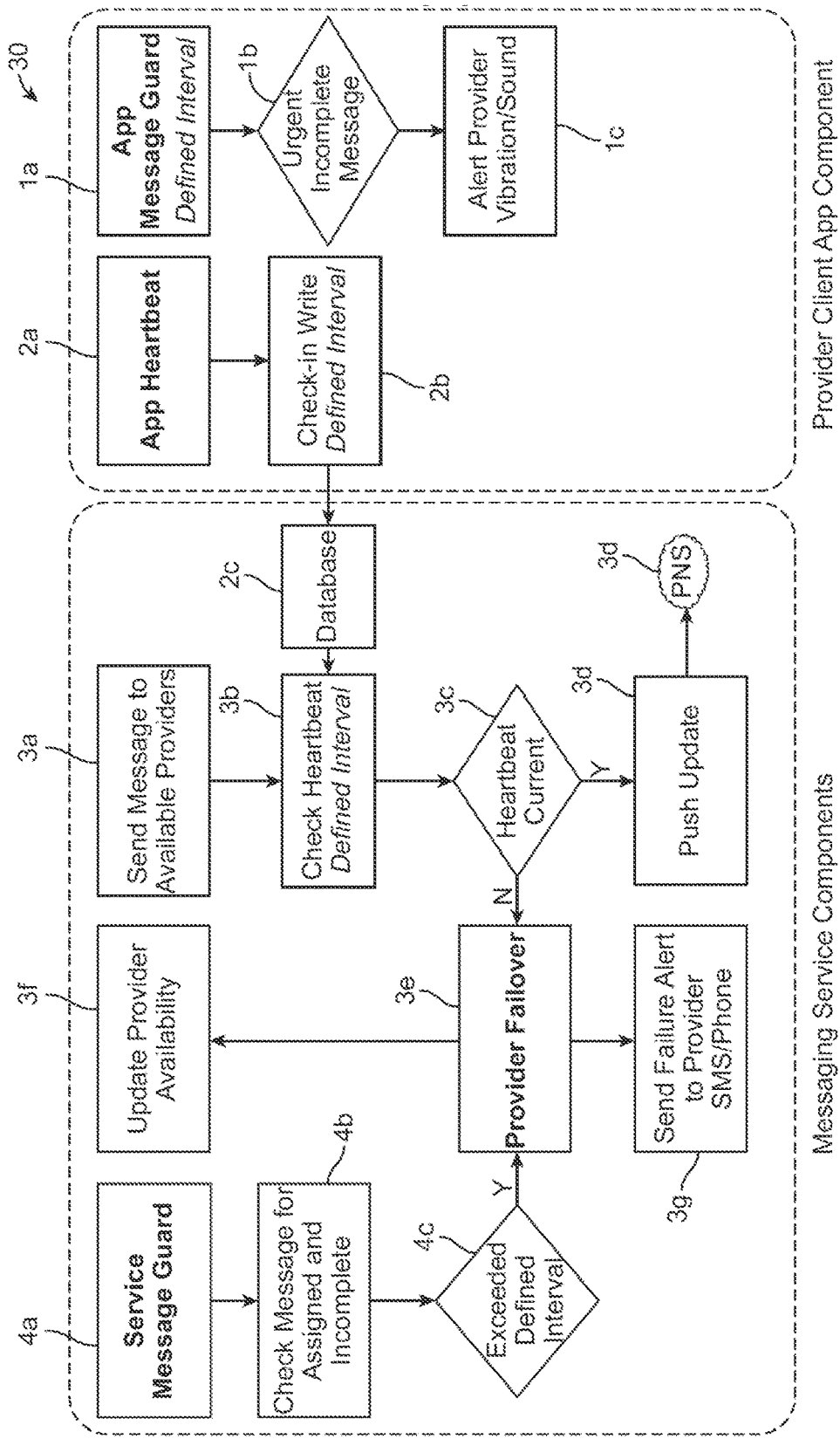
FIG. 3 shows a process flow for system availability, according to one embodiment.

FIG. 3 further illustrates a Heartbeat and Message Guard process flow 30, according to one embodiment, described below. The Heartbeat and Message Guard service provide dual modes of protection from the Messaging Service client module 200 as well as from the provider client function 90, working independently to mitigate non-response to urgent request messages. In operation, provider client function 90 Heartbeat process (process 2a) calls to database 70 (process 2c) on a defined interval performing, a check-in marking time of last connection (process 2b). When a request message is being sent to an available provider (process 3a) the Check Heartbeat process (process 3b) polls the database to determine the time of the last check-in of the provider app 90 of the primary service provider and confirms the check-in occurred within the defined interval (process 3c). If the Heartbeat occurred within the defined interval, the message is pushed to the provider client function 90 via the push update service (process 3d). If the Heartbeat did not occur within the defined interval, the Provider Failover process is initiated (process 3e). The Provider Failover module process updates a Provider Availability list (process 3f) by re-ordering the primary provider client function 90 that did not check-in, to the bottom of the provider availability list, and sends a SMS message and/or calls the service provider (process 3g) with a pre-recorded message to check the provider client app 90 is open and has connection to the Internet.

The Message guard service on the provider client app 90 checks the internal message queue (process 1a) for received messages that are Urgent and have not been completed within a specified time interval (process 1b) and alerts the provider app 90 with a vibration or sounds based on provider preferences (process 1c).

The Messaging Service module 200 also performs a Message Guard service (process 4a) that determines if messages have been previously sent to a provider client app 90 (process 4b) and have not been acted on within a defined time interval (process 4c), and triggers the Provider Failover process (process 3e) as above.

As shown FIG. 2, in one embodiment of the system 20 for a healthcare application, the Data Services module 80 provides a service function that connects several streams of health data from patients/individuals with healthcare providers and new market of health analytics services. In a healthcare application, in one example, the patients are requester entities (e.g., Data Publishers), the health care providers are provider entities (e.g., Data Subscribers), and the messaging service module 200 (and service module 60) provides data exchange and collection function as described herein (e.g., Service Platform), as described below in relation to a health bridge platform 200N disclosed hereinbelow.

Figure 2A:
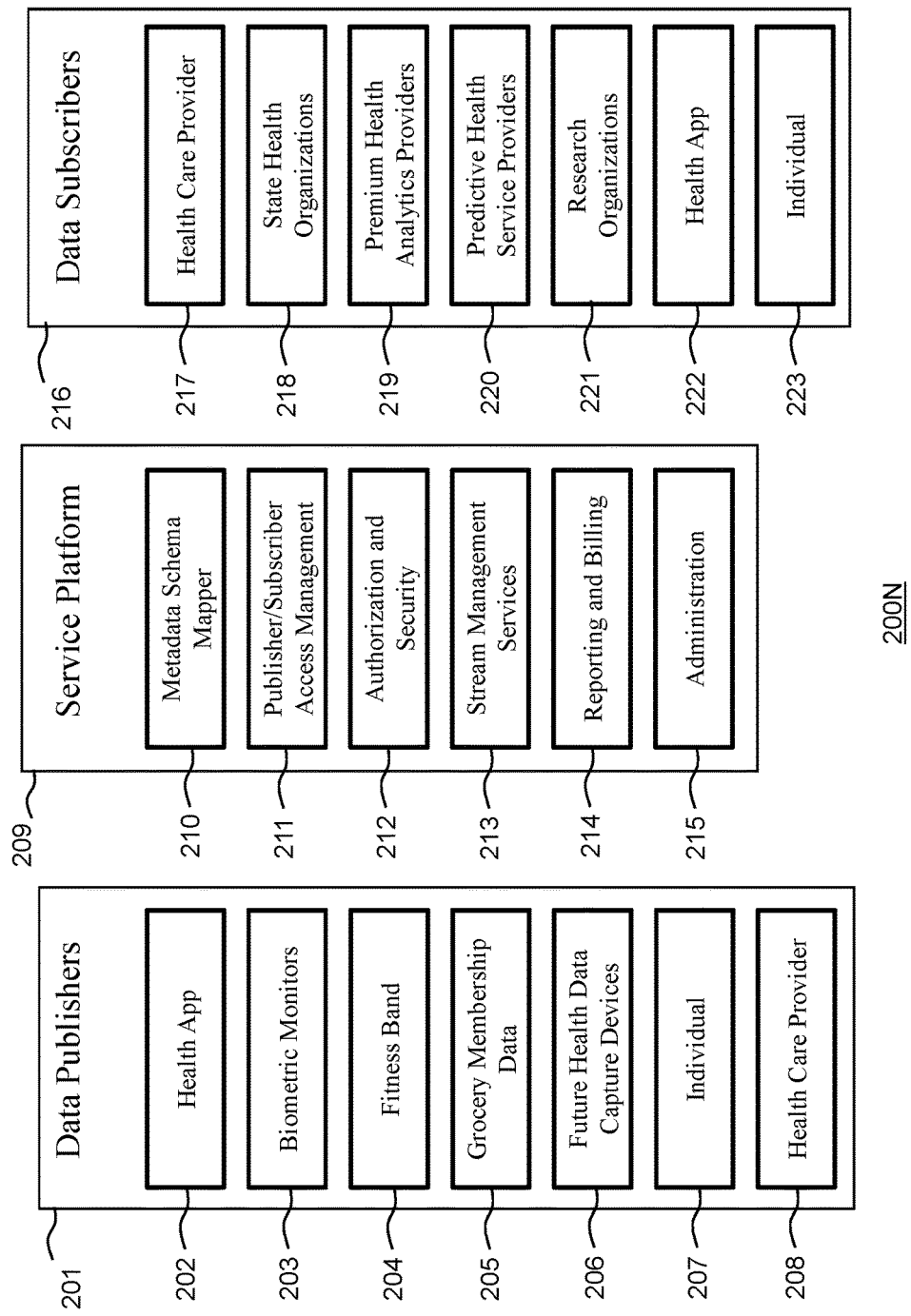
FIGS. 2A-2B depict a Health Bridge health data publishing and subscription gateway platform and process, according to one embodiment.

FIG. 2A illustrates a functional block diagram of a health bridge health data publishing and subscription gateway system/platform 200N, according to one embodiment. The platform 200N comprises a data publishers component 201 (e.g., Publishers), a service platform component 209 (e.g., Service Platform), and data subscribers component 216 (e.g., Subscribers).

Conventionally, health data service providers must provide interfaces to health analytics and electronic health record systems, uniquely and without orchestration making the flexibility of exchanging, sharing and monetizing the data or services difficult and costly to achieve. The health bridge system/platform 200N disclosed herein provides a standard interface and data mapping scheme (via the service platform 209) to receive and transmit information to and from various computing devices, requesters and providers, including the highly scalable real time service platform 209 to secure and connect data publishers 201 and data subscribers 216. In one embodiment, the health bridge platform 200N provides great cost savings by maintaining the shared service platform 209 as funded by participants such as service requesters and/or service providers. For example, healthcare providers 217 as Data Subscribers can receive information from the health bridge service platform 209 in their EHR and Health Record systems to build profiles and analytics on the real time data stream. Health providers can also subscribe to analytics services.

Analytics services are organizations that consume health data from providers and provide analysis of that data (e.g., to determine trends, risks, profiles, recommendations, outcomes, plans, etc.). This data is served back out through health bridge 200N directly to consumers or via Health providers as a value add service to their patients.

The service platform 209 includes a metadata schema mapper 210, publisher/subscriber access management 211, authorization and security 212, stream management services 213, reporting and billing 214, administration 215, and health provider. The data subscribers 216 may include health care providers 217, state health organizations 218, premium health analytics providers 219, predictive health service providers 220, research organizations 221, health Apps 222, and individuals 223.

When new data publishing devices are added to the health bridge, their metadata is mapped into a master schema by the metadata schema mapper module 210, allowing consistent access to data from any Data Publisher or Data Subscriber.

Publisher/subscriber access management module 211 allows Data Publishers to choose which data they want to share with health bridge platform (e.g., service platform 209) and who they want to share the data with. Sharing of anonymous data is encouraged to allow health organizations to analyze aggregate data across millions of data publishers.

Once a data publisher or subscriber is activated, a security key is generated by the authorization and security module 212 for the interaction and controls access to and from the health bridge platform (e.g., service platform 209). Access keys can be revoked at any time from the data publisher.

Data is buffered and streamed by the stream management services module 213, from data publishers to data subscribers. Stream management allows unlimited amounts of incoming data to be routed to the right Data Subscriber.

A reporting and billing module 214 provides (real time) reporting and system statistics, utilization and data in flow. Usage billing for publishers and subscribers is processed in this manner.

System administration module 215 provides functions related to metadata schema management, authorization, authentication, data stream management, and system availability.

Figure 2B:
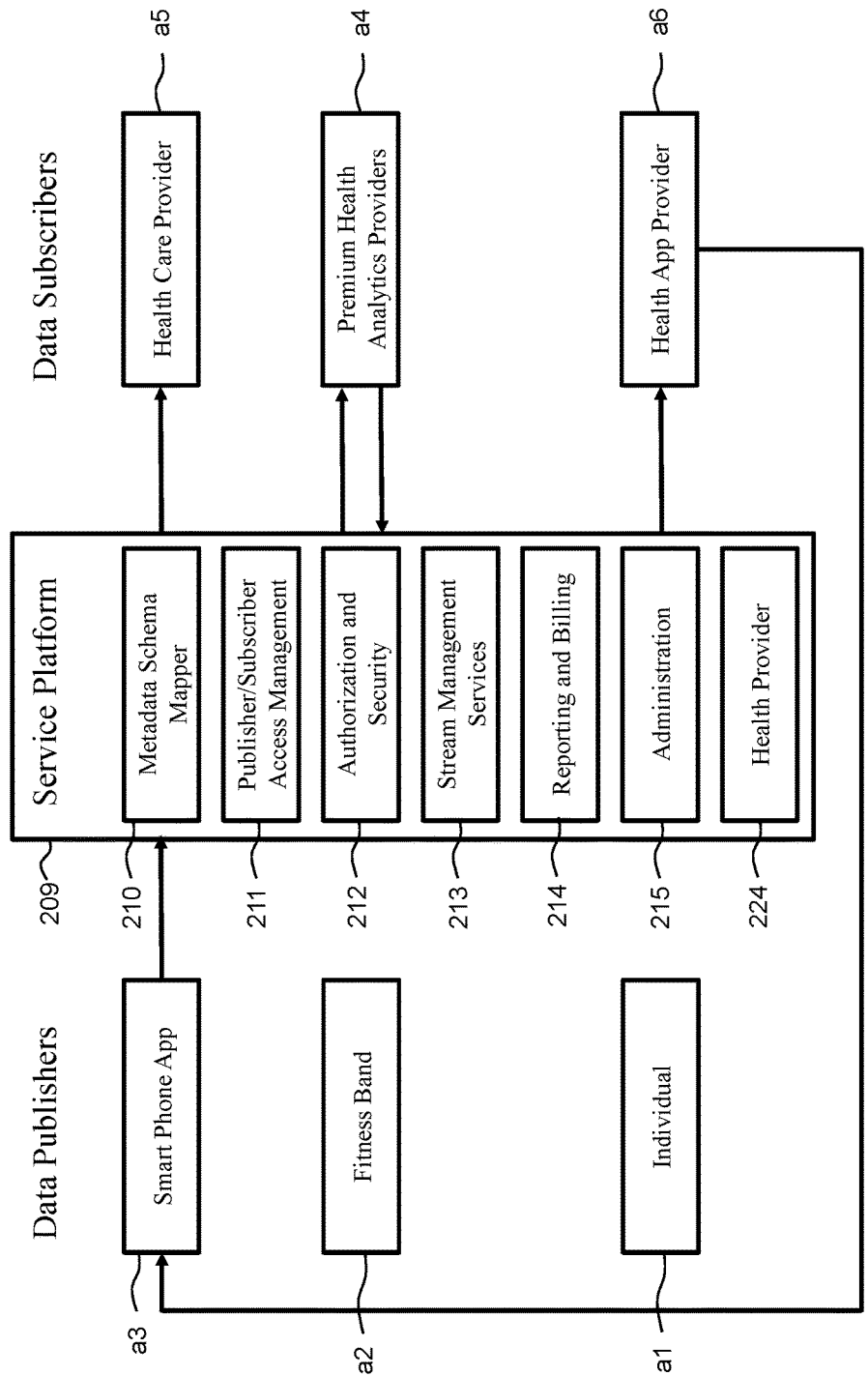

FIG. 2B illustrates an example process in the health bridge platform 200N, according to one embodiment disclosed herein. In process a1, an individual (or computing device) accepts invitation to share data with a Health Care Provider. In process a2, an individual (e.g., requester) links a fitness band computing device to a Smart Phone App. In process a3, an individual connects the smart phone App to the service platform 209 and authorizes access of data by a health care provider (e.g., service provider). In process a4, a data stream is consumed by analytics providers, processed and published back to the service platform 209 for the health care provider and health App provider. In process a5, processed health data is consumed from a premium health analytics provider. In process a6, Health App provider is subscribed to premium health analytics and sends data back to the individual via smart phone App.

Health data from data publishers 201 comprises information that is streamed from health devices (such as phones, watches, fitness bands 204, health apps 202, fitness equipment such as biometric monitors 203, grocery membership data 205, future health data capture devices 206, individual generated health information 207, and health provider generated health information 208) into the system.

Consumers can freely and easily publish their health data devices to the health bridge 200N service authorizing providers and analytics services to provide insight into their health trends. Health providers can subscribe to this health data and analytics of the health data to provide proactive care and recommendations to their patients. Patients can also subscribe to independent analysis of their own self-published health data and the data provided by their health providers for an unparalleled analysis of health information.

Research firms, international studies, computer modeling, predication organizations can access the data provided by the health bridge disclosed herein, as allowed, and provide a new category of services to the consumer, health providers, health organizations, and the global community through the health bridge platform 200N. In this sense, Data Publishers can also be Data Subscribers creating a continuous loop of information, such as from the individual (Publisher) who wishes to share health information so they may receive added value by a third party service provider (Subscriber) who then analyses and provides additional value added data back to the Publisher who can directly or indirectly through the same publishing device subscribe to the augmented data.

In one embodiment, one or more modules of the data publishers component 201 are implemented on a computing platform, such as a computing device/platform 100R in FIGS. 1 and 1A, as logic bocks. An example of the computing device/platform 100R comprises a computing system 250 shown in FIG. 22, and/or a computing system 400 shown in FIG. 23.

In one embodiment, one or more modules of the service platform component 209 are implemented on a computing platform, such as the computing device/platform 200M in FIGS. 1 and 1A, as logic bocks. The service platform component 209 enables data storage (and data access), such as utilizing a database 70 in FIG. 2, database 268 in FIG. 24, etc. An example of the computing device/platform 200M comprises a computing system 261 shown in FIG. 24, and/or a computing system 23 shown in FIG. 23.

In one embodiment, one or more modules of the data subscribers component 216 is implemented on a computing platform, such as the computing device/platform 300P in FIGS. 1 and 1A, as logic bocks. An example of the computing device/platform 300P comprises a computing system 250 shown in FIG. 22, and/or a computing system 400 shown in FIG. 23.

Figure 24:
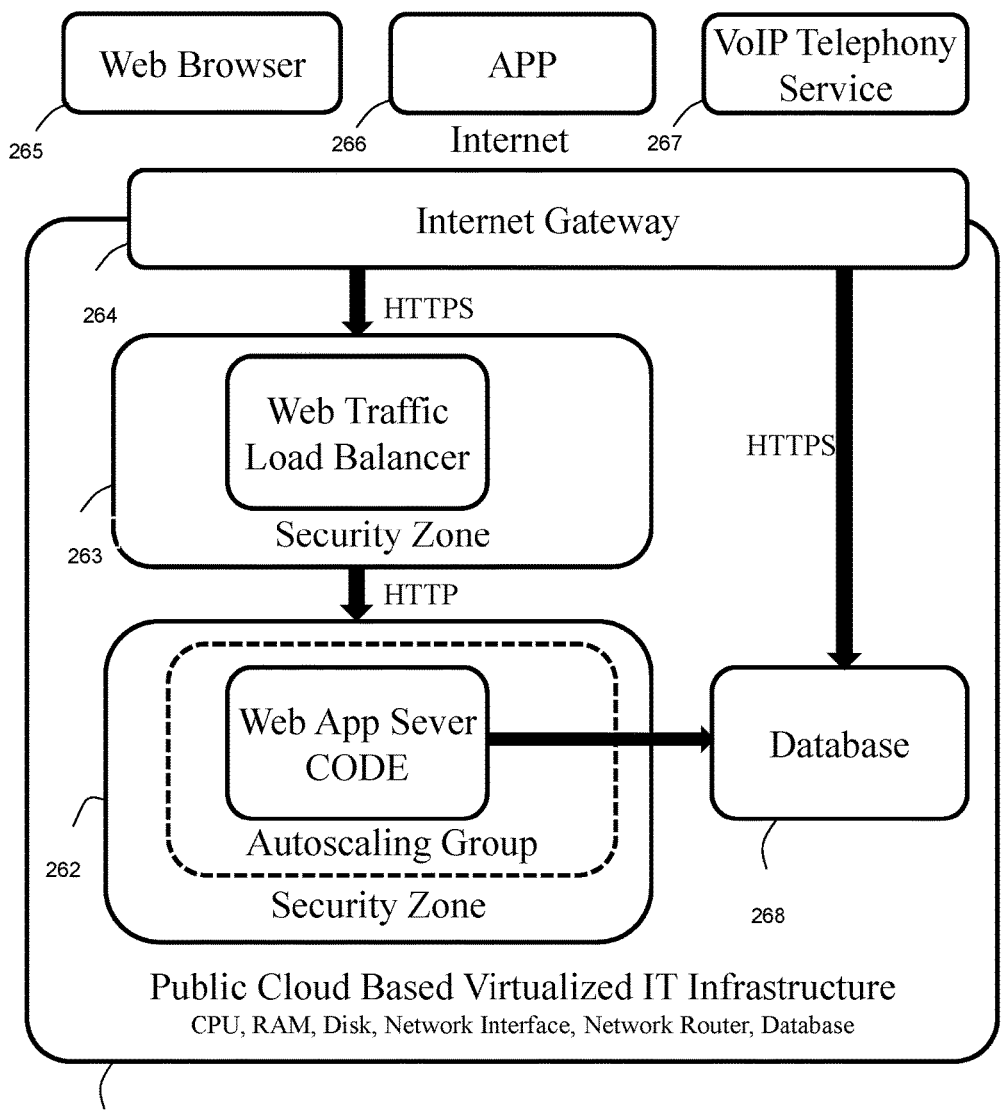

In one embodiment of the notification system 20, the service system 200 (which includes the functions of the notification service module 60 and the health bridge service platform component 209), is implemented on a computing platform such as the computing system 261 shown in FIG. 24. In one embodiment, the notification system 20 is implemented on a computing platform such as the computing platform 260 shown in FIG. 24.

In one embodiment, when a request is received by service system 200, the request is then sent to a provider via a push notification. The request is handled in a one-to-one relationship between the requestor and a primary provider, with a failover to another one-to-one relationship between the requester and a secondary provider. In another embodiment, the request, or response, can also be subscribed to by external/gateway devices in the publish and subscribe model disclosed herein, such as the health bridge.

One embodiment comprises: setting at a data publisher device having a processor and a data publisher component, a data sharing authorization level; linking at the data publisher component, one or more health devices to the data publisher component; transmitting from the linked one or more health devices, raw health data to the data publisher component; transmitting from the data publisher component, raw health data from the linked one or more health devices to a service platform device having a processor and a service platform component based on the set data sharing authorization level; transmitting from the service platform component, the raw health data to a data subscriber device having a processor and a data subscriber component; and receiving at the service platform component, processed health data based on the raw health data from the data subscriber component.

FIGS. 4 through 9B show implementation details of an example of the notification system/platform modules, according to one embodiment. One embodiment comprises a message notification system implementing a process including:

forming a request at a requester client module, wherein the step of forming includes, for example, determining attributes of the requester (e.g., location, profile, phone number, name, DOB, etc), and request content (e.g., "I am bleeding") from the requester;

transmitting the request to a messaging service module (e.g., message processor);

using an API for messaging service module, generating a request message (e.g., unique ID, etc.);

determining primary provider entity to service the request (e.g., the provider client receiving device);

transmitting request message to a notification service (e.g., provider client receiving device push notification service or the voice service module can call the provider client entity phone at the registered phone #);

wherein client entity can be alerted of the request (e.g., provider client generating an audible alert, or the voice service module can call the provider client entity phone at the registered phone number, which can be at primary number or alternate number based on circumstances);

upon the provider client module (or the client entity) receiving the notification, retrieving the corresponding request content and attributes from the request message;

generating a reply to the requester (and the requester maintains a record of physician-patient interaction and related information);

if the provider client module does not receive the notification (e.g., message guard information), to ensure that the requester receives a response based on the applicable standard of care (e.g., as defined by the provider entity), in one implementation when provider client module does not respond to the request such as when the provider client entity is not answering a received request, or provider client entity does not receive the request, a failover to another provider is performed; and transmitting a reply to the requester client entity wherein the nature of the reply is based on nature of the content of the request (e.g., electronic message, or phone call, using attribute/profile/selection information from the requester).

Another embodiment comprises a message notification system implementing a process including: forming a request at a requester device having a processor and a requester client module configured to receive requests; transmitting the request from the requester client module to a message device having a processor and a messaging service module configured to process requests; generating at the messaging service module, a request message based on the request; determining at the messaging service module, a primary provider entity to service the request message; and transmitting from the message device, a notification of the request message to a first provider device associated with the primary provider entity, first provider device having a processor and a provider client module configured to process the notification; in response to an indication that the first provider device received the notification within a time period: transmitting from the messaging service module, the generated request message to the first provider device or intermediary external service providers/gateways subscribed to the request (or response); generating at the first provider device, a request message reply; and transmitting from the first provider device, the request message reply to the requester device; in response to an indication that the first provider device did not receive, or respond to, the notification within the time period: determining at the messaging service module, a second provider entity as the failover provider entity; transmitting from the message device, the request message to a second provider device associated with the failover provider entity, the second provider device having a processor and a provider client module configured to process requests; generating at the second provider device, a request message reply; and transmitting from the second provider device, the request message reply to the requester device.

Figure 4:
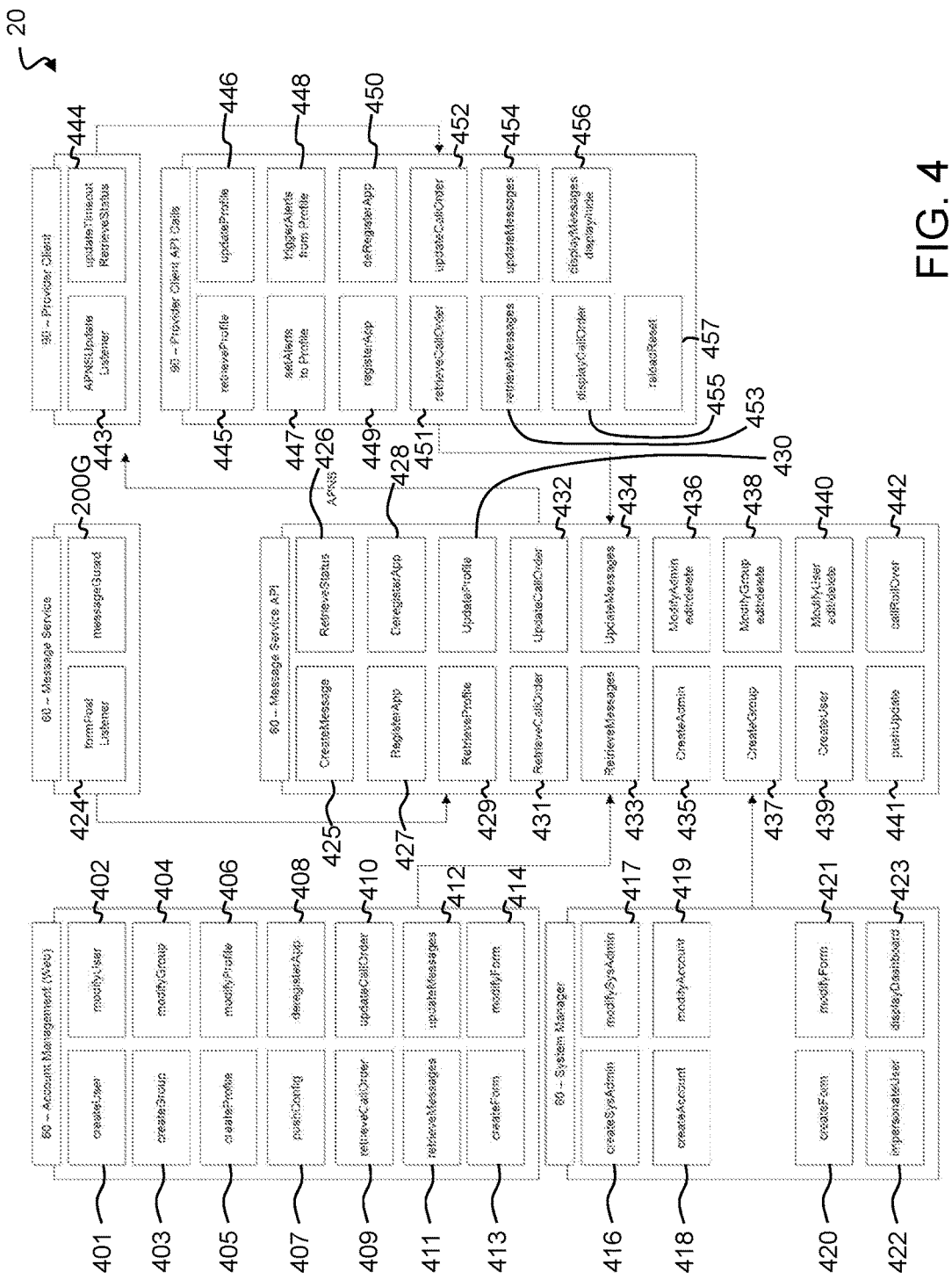
FIG. 4 shows a functional block diagram of the overall notification system and process disclosed herein, according to an embodiment.

An example implementation is described herein below in relation to flowcharts in FIGS. 4-9B, and the GUI displays in FIGS. 10-21. FIG. 4 shows a functional block diagram of an implementation of the overall system 20 and process disclosed herein, according to an embodiment. The system manager module of the service module 60 includes a web account management module, which provides provisioning and management of service provider accounts and security settings. The account management module further provides access based control functions such as create a new user function 401, modify an existing user function 402, create a new group function 403, modify an existing group function 404, create a new profile function 405, modify an existing profile function 406, configure the push notification service function 407, de-register an application function 408, retrieve a call order function 409 and update a call order function 410 (e.g., FIG. 19), retrieve messages function 411 and update messages function 412 (e.g., FIG. 18), and create a new form 413 and modify an existing form function 414 (e.g., FIG. 20).

The system manager module further provides system administration and allows for viewing and modifying settings of system wide parameters. The system manager module 60 provides features such as create a new system administrator 416 function, modify an existing system administrator settings 417 function, create a new account function 418 or modify an existing account function 419 (e.g., FIG. 21), create a new form 420 and modify an existing form 421, impersonate a user account function 422, and view a display dashboard function 423.

The service module 60 further provides feature such as a form post listener function 424 and a message guard component 200G (FIG. 2). The service module 60 may utilize a message service API, which manages the receipt and transmission of messages. The message service API provides features such as create a new message function 425, retrieve a status function 426, register an application function 427, deregister an application function 428, retrieve a profile function 429, update a profile function 430, retrieve a call order function 431, update a call order function 432, retrieve messages function 433, update messages function 434, create an administrator function 435, modify or delete an administrator function 436, create a new group function 437, modify or delete an existing group function 438, create a new user function 439, modify or delete an existing user function 440, configure the push notification service function 441, and set call rollover function 442.

The provider client function 90 of the system 20 is alerted to an incoming message from the service module 60. The provider client function 90 provides various options in replying to and documenting incoming messages and outgoing replies. The provider client function 90 provides function such as a push notification listener function 443 (e.g., Apple Push Notification Service (APNS) update listener) and an update for timeout for retrieving status function 444, such as if there is a connection error or a provider is non-responsive to a request. The provider client function 90 may utilize a provider client API call. The Provider Client API 90 provides features such as retrieve a profile function 445, update a profile function 446, set alerts to a profile function 447, trigger alerts from a profile function 448, register an application function 449, deregister an application function 450, retrieve a call order function 451, update a call order function 452, retrieve messages function 453, update messages function 454, display a call order function 455, display or hide messages function 456, and reload or reset a provider application function 457.

Figure 5:
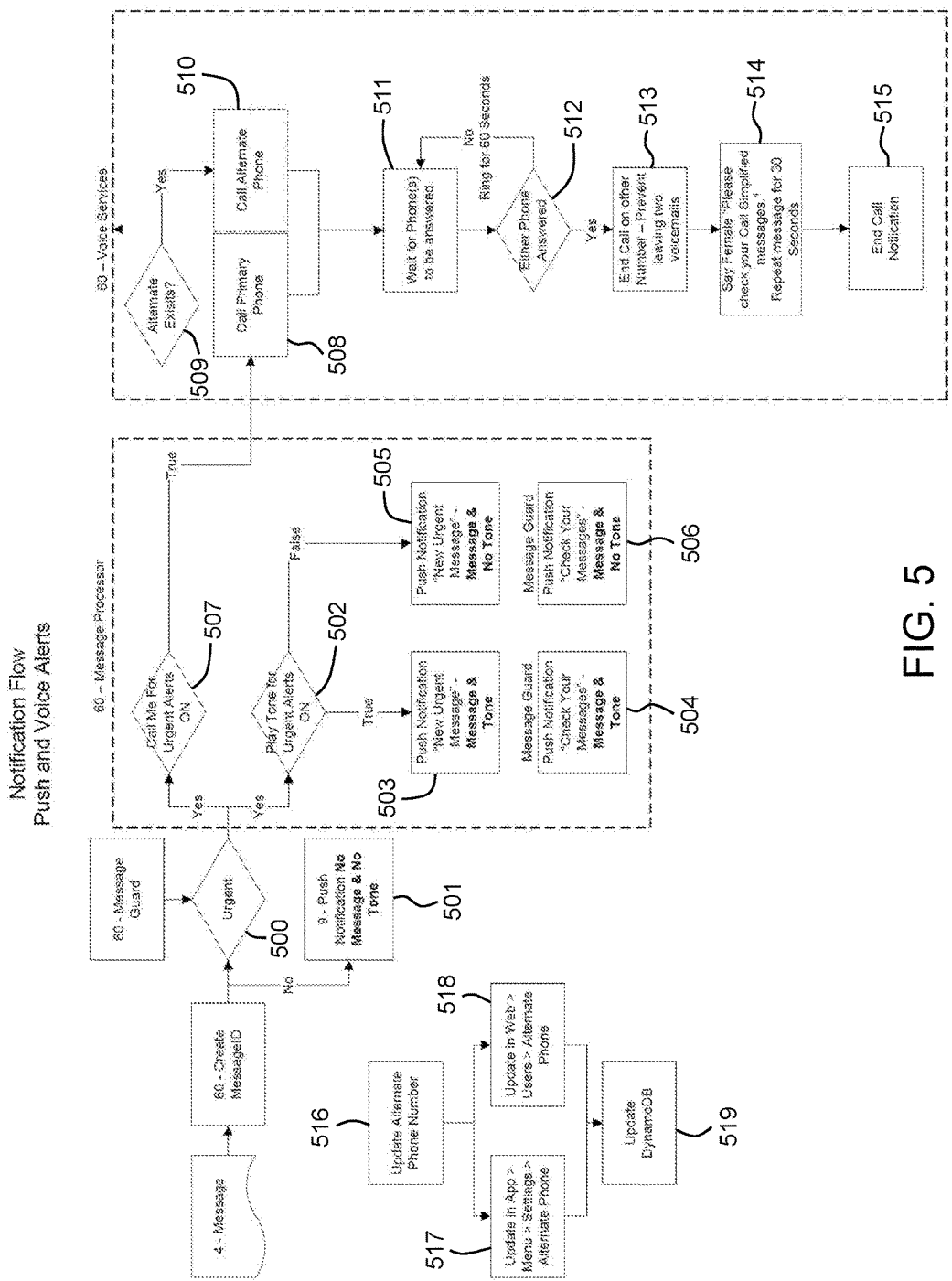
FIG. 5 shows a functional block diagram of the notification system and process for providing push and voice alerts as disclosed herein, according to an embodiment.

FIG. 5 shows a functional block diagram of a notification system and process for providing push and voice alerts as disclosed herein, according to an embodiment. A message 4 is created and a message ID is created for the message 4 by the service module 60. A message guard function of the service module 60 determines if the message is urgent (process 500). If the message is not urgent, a function 9 delivers a push notification to a provider with no message and no tone (process 501). If the message is urgent, and the provider has selected to play a tone for urgent alerts (process 502), then a push notification for a new urgent message with the message and a tone (process 503) is delivered to the provider. If message guard is activated, the provider then receives an additional push notification to check messages with the message and a tone (process 504). If the message is urgent, and the provider has selected not to play a tone for urgent alerts, then a push notification for a new urgent message with the message and no tone is delivered to the provider (process 505). If message guard is activated, the provider then receives an additional push notification to check messages with the message and no tone (process 506).

If the message is urgent, and the provider has selected to receive a call for urgent alerts (process 507), then the voice services module of the service module 60 calls a primary phone number for the provider (process 508). If an alternate phone number exists (process 509), the voice services module may call an alternate phone number as well (process 510). The voice services module then waits for either the phone or alternate phone to be answered for a set time, such as ring for sixty seconds (process 511). If one of the phones is answered (process 512), the other phone call is disconnected to prevent leaving duplicative voicemails for a provider on both primary and alternate phones (process 513). The voice services module alerts the provider to check their messages and repeats this message for a set time (process 514), such as repeat the message for thirty seconds. Then, the call notification is ended by the voice services module (process 515). An alternate phone number for the provider may be updated (process 516) in an application (process 517) or web interface (process 518), which updates the alternate phone number in a database such as database 70 (process 519).

Figure 6:
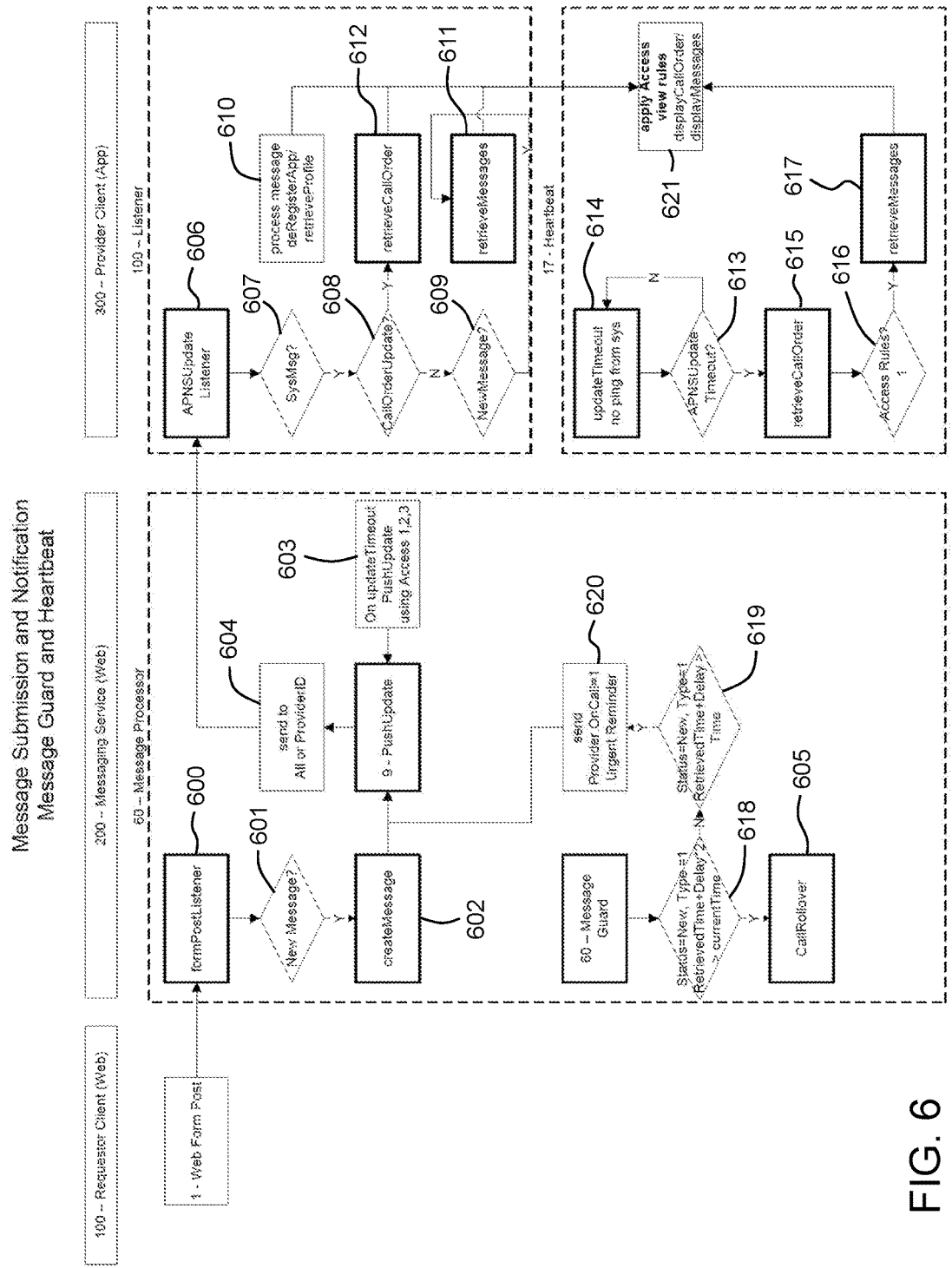
FIG. 6 shows a functional block diagram of a message submission and notification system and process for ensuring provider response as disclosed herein, according to an embodiment.

FIG. 6 shows a functional block diagram of a message submission and notification system and process for ensuring provider response as disclosed herein, according to an embodiment. A requester web client 100 submits a web form post 1. The message processor of the service module 60 for the web messaging service 200 receives the web form post 1 via a form post listener function (process 600). If the message is a new message (process 601), then a new message is created (process 602). The created new message is sent to a provider client application 300 by a push update 9 accomplished once an update timeout occurs (process 603). The message is sent to all providers or a specific provider ID (process 604). A message guard module of the service module 60 ensures that requestor messages are responded to within a set interval. The message guard module is triggered when a failed heartbeat event 17 occurs or a message guard event occurs, causing the next provider client in a list to be promoted to the primary provider client (e.g., FIG. 3).

Message guard component of the service module 60 will execute periodically and check for New and Urgent (e.g., Type 1) messages (processes 618, 619, 620) where the message has not been retrieved or completed by the 300 Provider Client App. The process has variable levels of actions based on incomplete messages such as doing a Push Update 9 if the initial timeout period has passed or performing a Call Rollover (Failover) if the subsequent timeout period has passed (process 605). The failover would start the process of notification and message monitoring with the alternate provider.

A listener function of the requester module 100 executes on the requester App device platform (e.g., a smartphone) where the device listens for an update from the network that was sent by Push Update 9 (process 606). The message can include system information such as the status of messages (process 607), a new call order such as one provider being removed from the call list (process 608), or a new message being received (process 609). The App then processes these messages and performs functions such as deregistering the App from the device and logging out for security reasons (process 610), processing message details to display to the Provider Client Entity (process 611), and retrieving the current call order if the order has been updated (process 612).

The Heartbeat process 17 in the requester App will attempt to reach the service module 60 in a closed loop (process 613). If requester App cannot reach the service module message processor for an Update Timeout period (process 614), the requester App will attempt to retrieve the Call Order one last time (process 615). If the requester App finds that the Client Entity has been promoted to Primary Access 1 (process 616) then the device will retrieve the messages (process 617).

A set of Apply Access view rules (e.g., FIG. 7) are sent with system messages and determine if the Provider App can view or not view, act or not act on messages depending if the Provider Entity is Primary Available, and if the Secondary is Available or Not Available which can be set by the system owner depending on the security and workflow of their organization (process 621).

Figure 7:
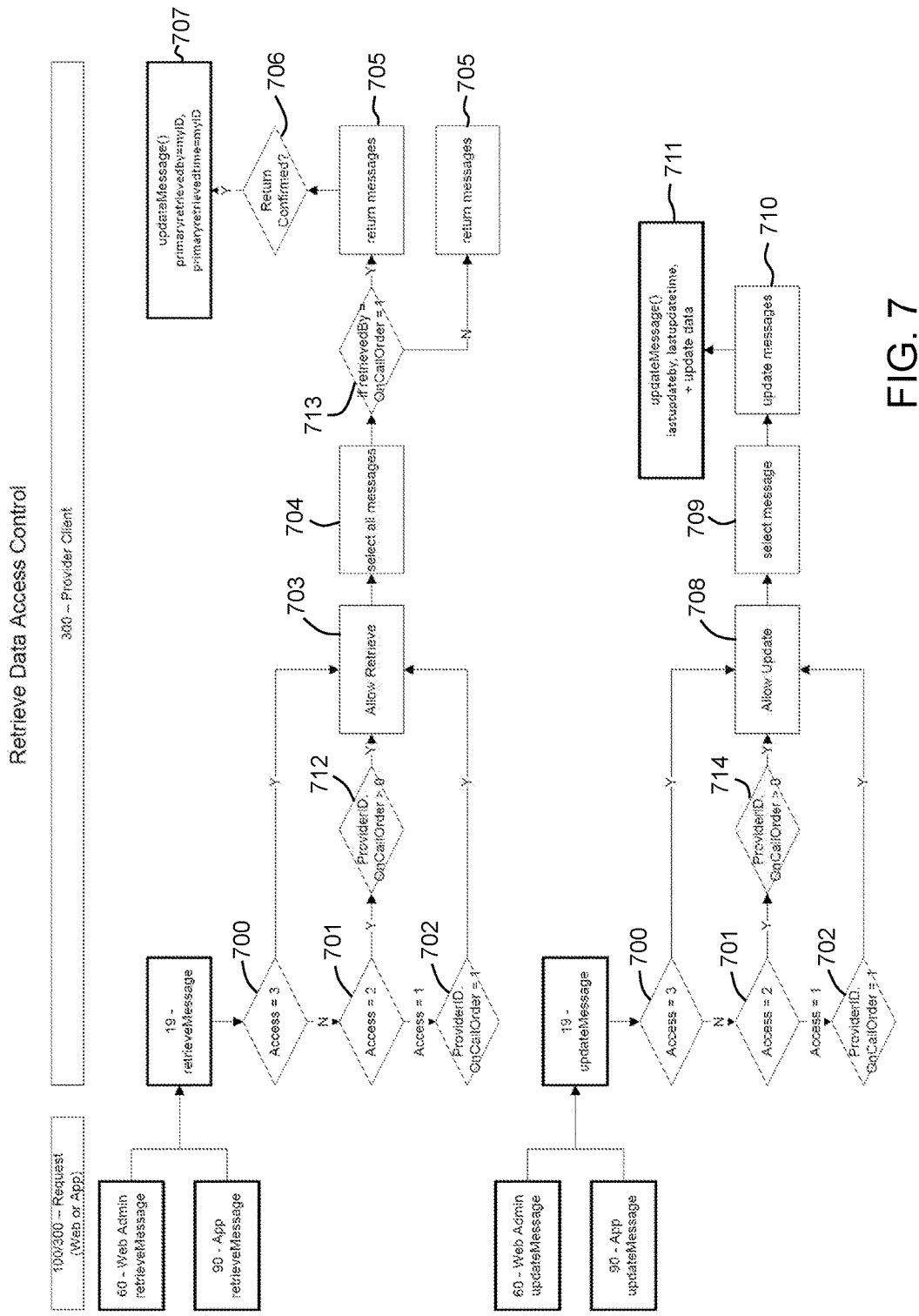
FIG. 7 shows a functional block diagram of a system and process for retrieving data and access control as disclosed herein, according to an embodiment.

FIG. 7 shows a functional block diagram of a system and process for retrieving data and access control as disclosed herein, according to an embodiment. A retrieve message module/function 19 of the provider client module 300 retrieves a message from the provider client application 90 of the module 300, or a web interface of the service module 60. The provider client module 300 determines the access level to Retrieve messages, such as Access Level 3 is Admin (process 700), Staff and Providers Access level 2 is Staff and Providers (process 701), Access Level 1 is primary Provider Only (process 702).

For example, if Access level 2 is allowed (Staff and Provider) then access is allowed only if Provider is on the availability list (process 712), such as $1^{st}$, $2^{nd}$ or $3^{rd}$ in the list, and not 0 (meaning not in the list). The messages list can be selected (process 703), wherein selecting all messages (process 704) returns the message list to the provider device. In one example, a message is retrieved by the provider, all messages are selected and returned (process 705). For an access level of Staff and Providers, the message is retrieved if the provider ID has an on call order greater than zero (process 712).

Once the messages list is returned (process 705), they are retrieved by the provider device. If the provider device that retrieved the messages is Primary provider (process 713), such as Availability=1, then confirm the messages were retrieved by that specific Provider user and update the message details with the Primary Provider user ID and the Time the Message was retrieved by the Primary Use (process 706). The system acknowledges who actually owns the message and confirms that the provider device actually retrieved the message. The update message process is similar to the retrieve message process, except the former process logic determines who can edit a message while the latter process logic determines who can read the message initially (i.e., the receiver) and that that receiver signs the message to confirm it was received. Thereafter, access rights (e.g., Access 3, 2, 1) allow the provider to update message details and write to the message (process 708). Updated message are then written to the message last updated by user ID, last update time, and the message data (process 711).

The messages are returned (process 705) and retrieved by a provider ID having an on call order of one (process 713). If the return is confirmed (process 706), the message is updated (process 707). An update message module of the provider client module 300 retrieves a message from an application 90 or a web interface 60. The provider client module 300 determines the access level (e.g., Admin, Staff and Providers; Staff and Providers; Primary Provider Only) to Update and Write to the retrieved message. For an access level of Staff and Providers, the message is updated (process 714) if the provider ID has an on call order greater than zero (process 712). The message is indicated as allowed to be updated (process 708), selected (process 709), and updated (process 710) by the provider along with the update data (process 711). The list of messages that can be retrieved, sorted (e.g., FIG. 18).

Figure 8A:
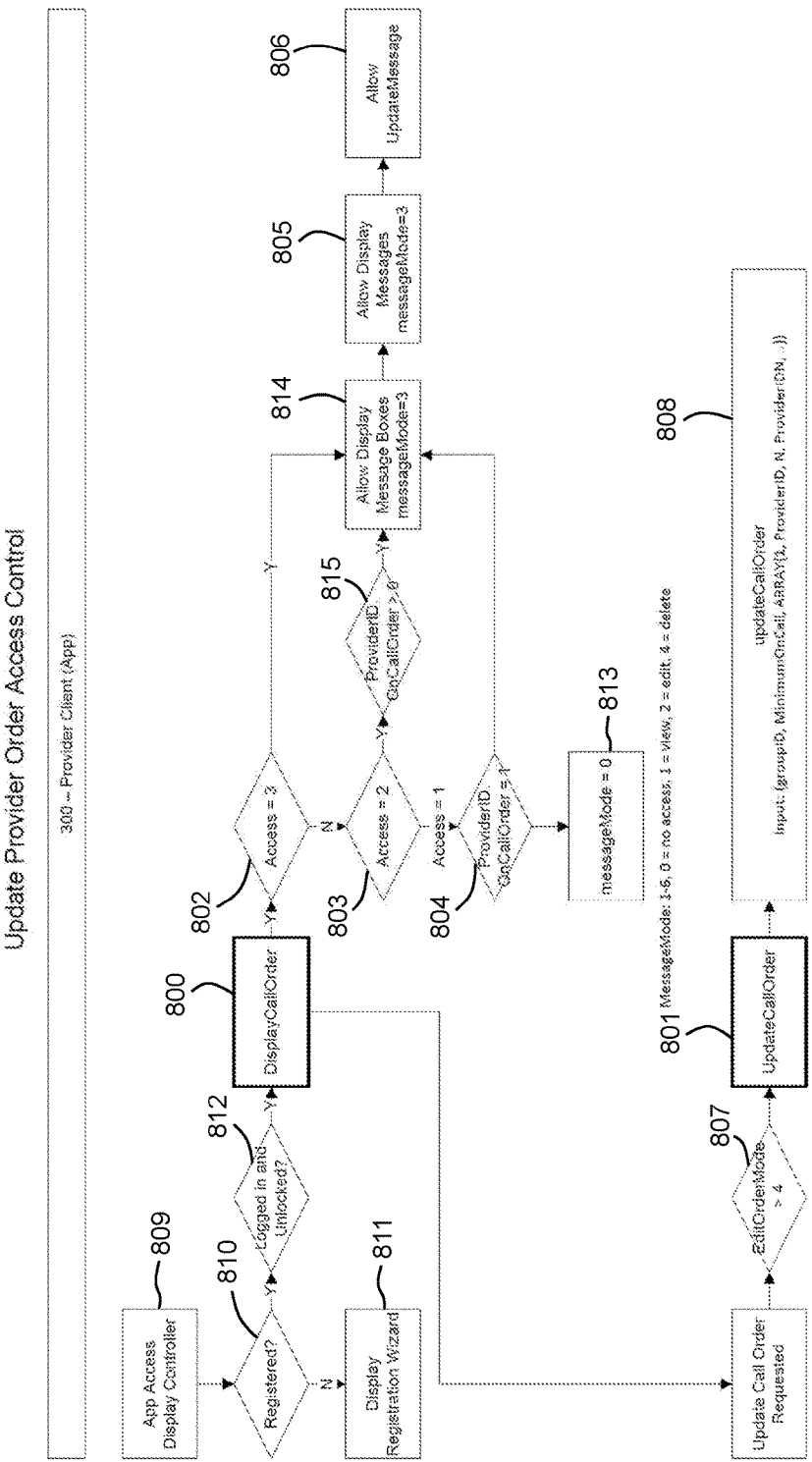
FIG. 8A shows a functional block diagram of a system and process for updating provider order access control as disclosed herein, according to an embodiment.
Figure 19:
FIG. 19 illustrates a web browser view of the call order used by the provider or office staff. The provider or staff can change the call order for the providers through the web application, according to one embodiment.

FIG. 8A shows a functional block diagram of a system and process for updating provider order access control as disclosed herein, according to an embodiment. The provider client module 300 may display a call order (process 800) or update a call order (process 801), as shown in FIG. 19, if the application is registered, logged in, and unlocked. An App access display control (process 809) may check to see if the provider App is registered (process 810). If the provider App is not registered, the provider will be sent to a display registration wizard (process 811). If the provider App is registered, it will be logged in an unlocked (process 812) in order to display the call order. Depending on the access level authentication (802—Admin, Staff and Providers, 803—Staff and Providers, 804—Primary Provider Only), message boxes may be displayed (process 814), the messages may be displayed (process 805), and the messages may be updated (process 806). For an access level of Staff and Providers (process 808), the message boxes are displayed (process 814) if the provider ID has an on call order greater than zero (process 815), meaning the Provider is on the Availability List. A value of zero means the Provider is not on the list and one or greater means the Provider order on the list. The Availability list determines who the first one to receive messages is, the system will retry a few times (call Failover/Rollover), then move the $2^{nd}$ person in the list to the $1^{st}$ position and the $1^{st}$ position in the list to the last position. If there is no access, a message mode is zero (process 813). Based on the edit order mode (process 807), the call order may be updated (process 808). The edit order mode may be one for administrators, two for staff, and four for providers (process 807). For providers and staff the edit order mode may be six, which the sum of each edit order mode. The message mode may range from one to six, with zero being no access, one being view only, two allowing editing, and four allowing deletion.

Figure 8B:
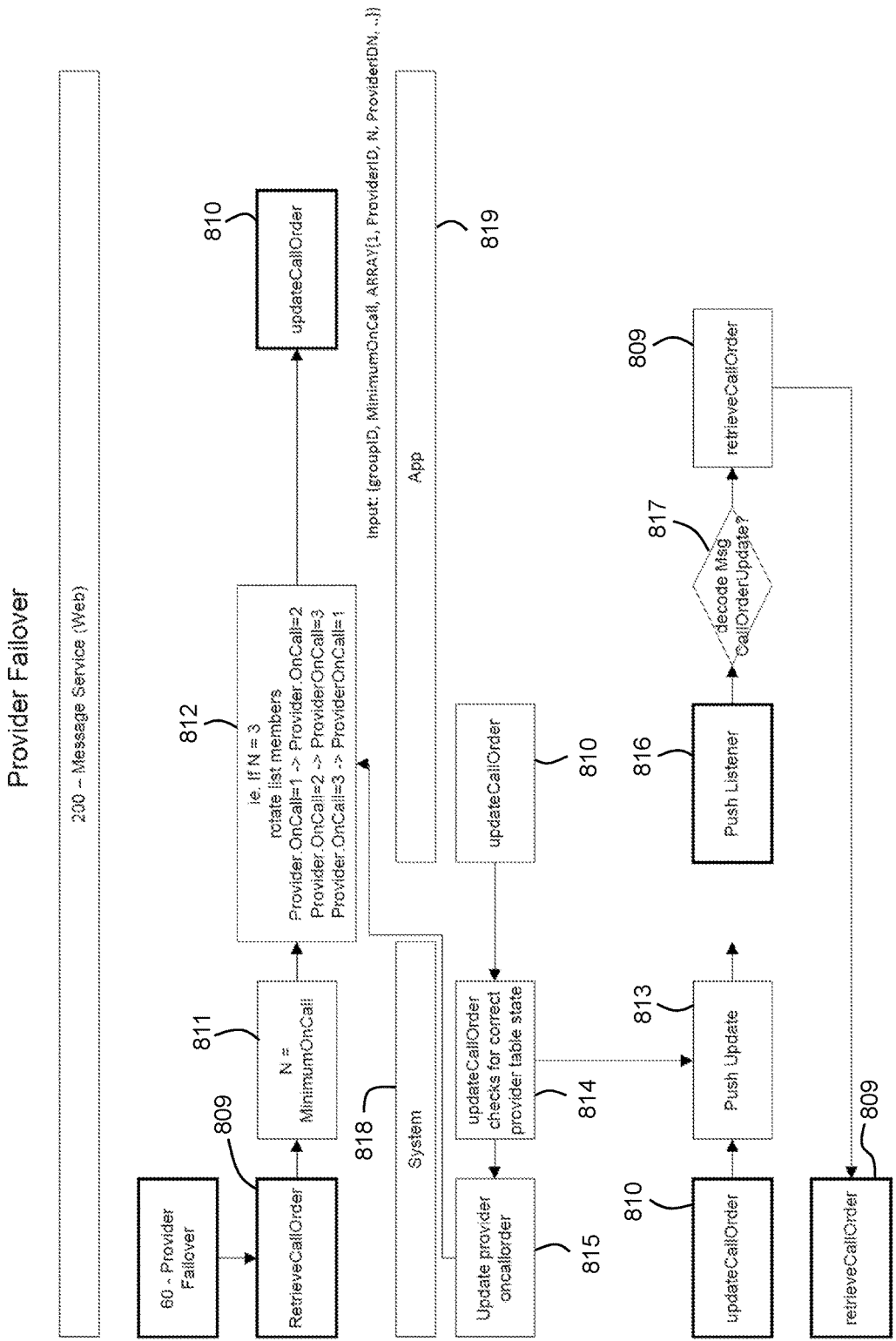
FIG. 8B shows a functional block diagram of a system and process for provider failover as disclosed herein, according to an embodiment.

FIG. 8B shows a functional block diagram of a system and process for provider failover as disclosed herein, according to an embodiment. The failover module of the web message service module 200 retrieves the call order 809. The provider failover module of the service module 60 updates a provider availability list call order (process 810) by re-ordering the primary providers (e.g., FIG. 3).

In one example, a Provider Entity organization such as a healthcare provider, can determine the minimum number of Providers that must appear in the call list according to their standards (process 811). If a primary provider App Client 819 is not available, then a module 818 of the service module 200, designates the next provider as Primary and the current Primary will become the last provider in the list (process 812). The list rotates between the members of the current provider list and the list can be updated interactively and is retrieved before an Update Call Order call is made to the system (process 810). The App performs an Update Call Order check for a correct provider table state reading the current state of the System Call Order (process 814) as it may be out of sync with the App call order if there is a change on the web system, and updates the provider on call order (process 815). When Update Call Order occurs and push update is sent to all the members of the list (process 813), each device then retrieves the current call order (process 809). The new Primary provider is then notified of all messages. A listener push update decodes the message (process 816) and determines if there should be a call order update (process 817), and retrieves the call order.

FIG. 9A shows a functional block diagram of a system and process for an account management master workflow as disclosed herein, according to an embodiment. A process 918 enables creating system administration account, including a system administrator input account profile data and account administration data, account defaults are pulled from a database, an account ID is generated, a group is created, and the system administrator account creation is complete. A process 919 enables deleting an account and includes selecting an account to be deleted, confirming the deletion of all groups and providers associated with that account, sending a push wipe to all devices using the account, purging the account, and the account deletion is complete. A process 920 enables modifying an account of a system administrator or account administrator and includes selecting the account to be modified, modifying the account profile data, and the account modification is complete.

A system 921 enables creating a group and includes selecting an account to be in the group, entering a group name, pulling account defaults for a parent account from the system database, modifying the group profile from the defaults, selecting members of the group, and the group creation is complete. A process 922 enables modifying a group and includes selecting a group from an account, modifying the profile of the group, and the group modification is complete. A process 923 enables creating a form and includes entering a form name for an account, assigning the form to a group, pasting form code into the form, generating a form ID, and the form creation is complete. A process 924 enables modifying a form and includes selecting a form from an account, modifying the name of the selected form, modifying the code of the selected form, and the form modification is complete.

Figure 9B:
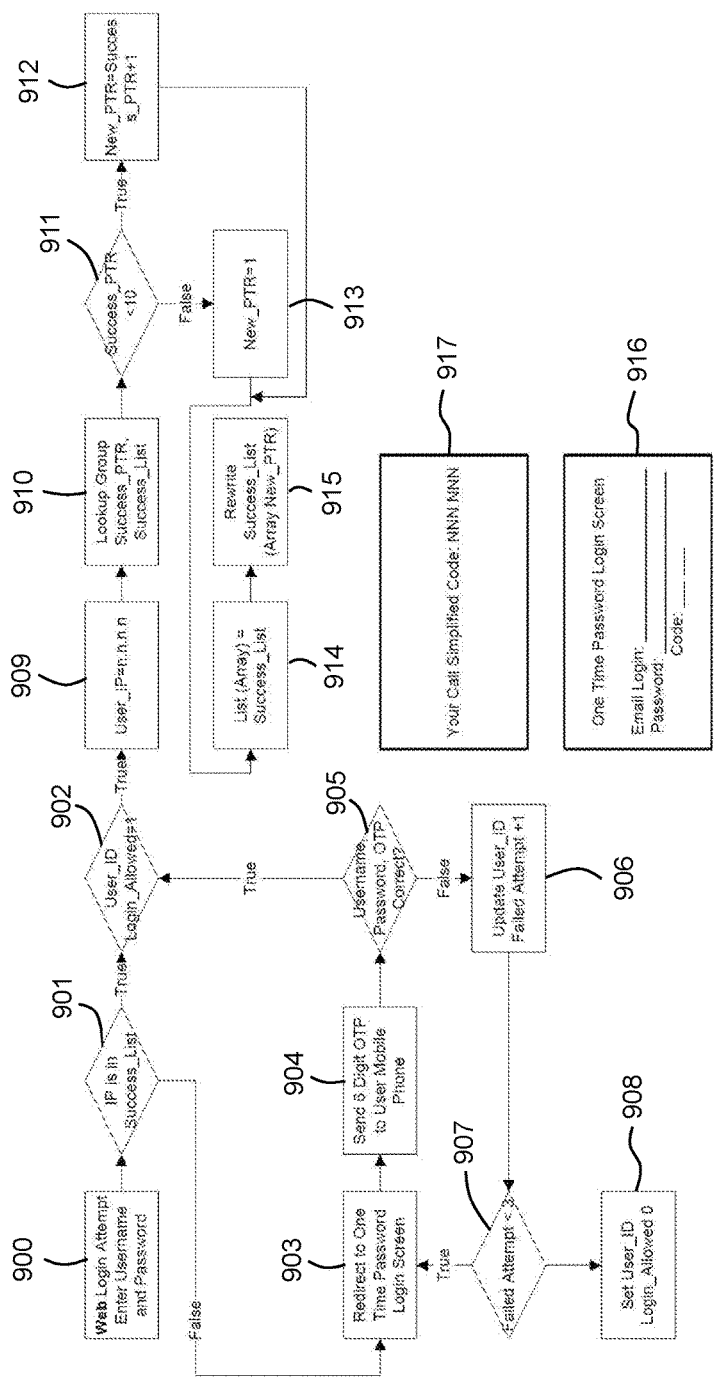
FIG. 9B shows a functional block diagram of a system and process for password security workflow as disclosed herein, according to an embodiment.

FIG. 9B shows a functional block diagram of a system and process for password security workflow as disclosed herein, according to an embodiment. A user enters a username and password as a web login attempt (process 900). The system checks if the IP address of the login attempt is in a success list of trusted IP addresses. If the IP address is in the trusted list of IP addresses then the login process is allowed (process 902). If the IP address is not in the trusted list of IP addresses, the user is redirected to a one time password login screen (process 903). The user is sent a One Time Password to the mobile phone number registered in their account profile. The user is sent a six-digit one time password (OTP) to their mobile device (process 904). The user enters the OTP, and the system checks to see if the username, password, and OTP are correct (process 905). If the username, password, and OTP are correct, the login process is allowed (process 902). If the username, password, and OTP are not correct (process 905), then the system updates the user's ID as having an additional failed attempt (process 906). The system checks to see if the user ID has less than three associated failed attempts to login (process 907). If the user ID has had three attempts to login then the system sets the user ID to not allow logins (process 908). This prevents a brute force intrusion into the system. If the failed attempts for a user ID are less than e.g., three (process 907), then the user is redirected to a OTP login system (process 903) to repeat the login process until the login is allowed (process 902) or the user ID is set to not allow logins (process 908).

A Pointer Process creates a list of length N=10 and each successful login has the IP address (process 909) added to the success list (process 910). As the list reaches N IP addresses (process 911) the next successful login is written to the first position in the list (process 912) so that only the last ten are listed and the position of the last successful login IP address in the list is indicated by Success PTR. When a user is allowed to login the username and password (and if required the one time password), are compared against the encrypted database 70. If all values match, the user is allowed access to the web application as either an Account Admin, Staff or Provider based on their group membership. If the list of IP addresses exceeds e.g., ten (process 911), a new PTR is created (process 913), the list of successful IP addresses is retrieved (process 914), and rewritten to include the new PTR (process 915). The rewriting process avoids the need to create a table. Instead, it uses an array of e.g., ten with ten positions and elements are shifted to the next position falling off the $11^{th}$ position and rolling back to the $1^{st}$ position. A One Time Password Login Screen may ask for a user email, password, and code (process 916). A code screen may list a code for the one time password login screen that may be sent via SMS message to user's registered SMS message number (process 917).

Figure 10:
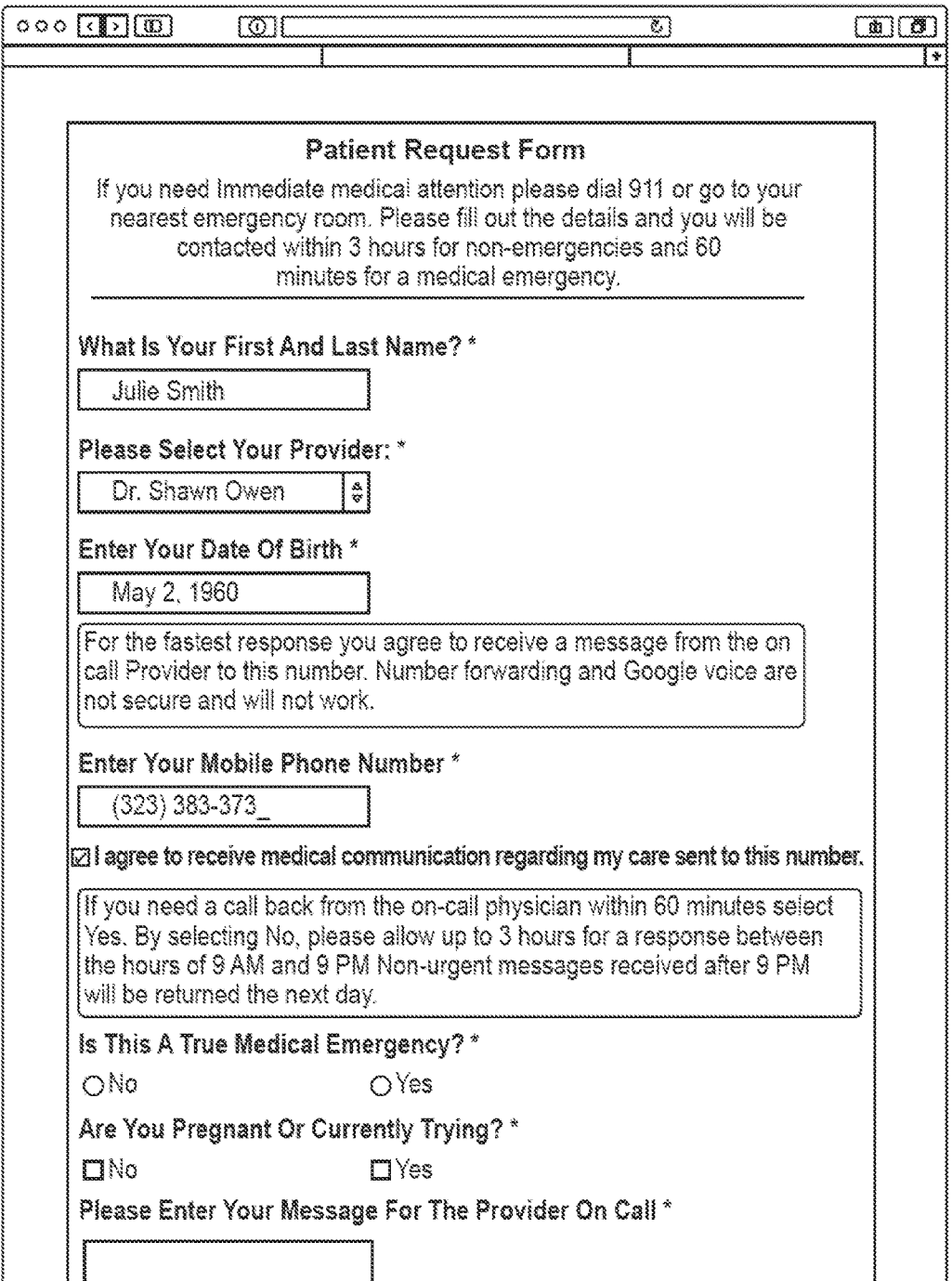
FIG. 10 illustrates a graphical user interface (GUI) display of a request form accessed by a requester (requestor) via a web browser link, according to one embodiment.

FIGS. 10-21 show example graphical user interface (GUI) displays and information generated by the disclosed notification system on display screens of the computing devices utilized herein, according to one embodiment. Specifically, FIG. 10 illustrates a graphical user interface (GUI) display 1000 of a request form accessed by a requester (e.g., Patient) via a web browser link, as shown in the web form post 1 of FIG. 6. The requester enters the required data, which may include a requester name, a requester provider, a requester date of birth, and a requester phone number. The requester may be prompted to answer if this request pertains to a true medical emergency and if they are pregnant or currently trying. The requester may then enter a message to be answered by the provider on call. The requester can also call into a phone number and record a message, and the phone system will then submit the request into the messaging service, according to one embodiment. The request form is sent the data to the service module 60, as shown in FIG. 6.

Figure 11A:
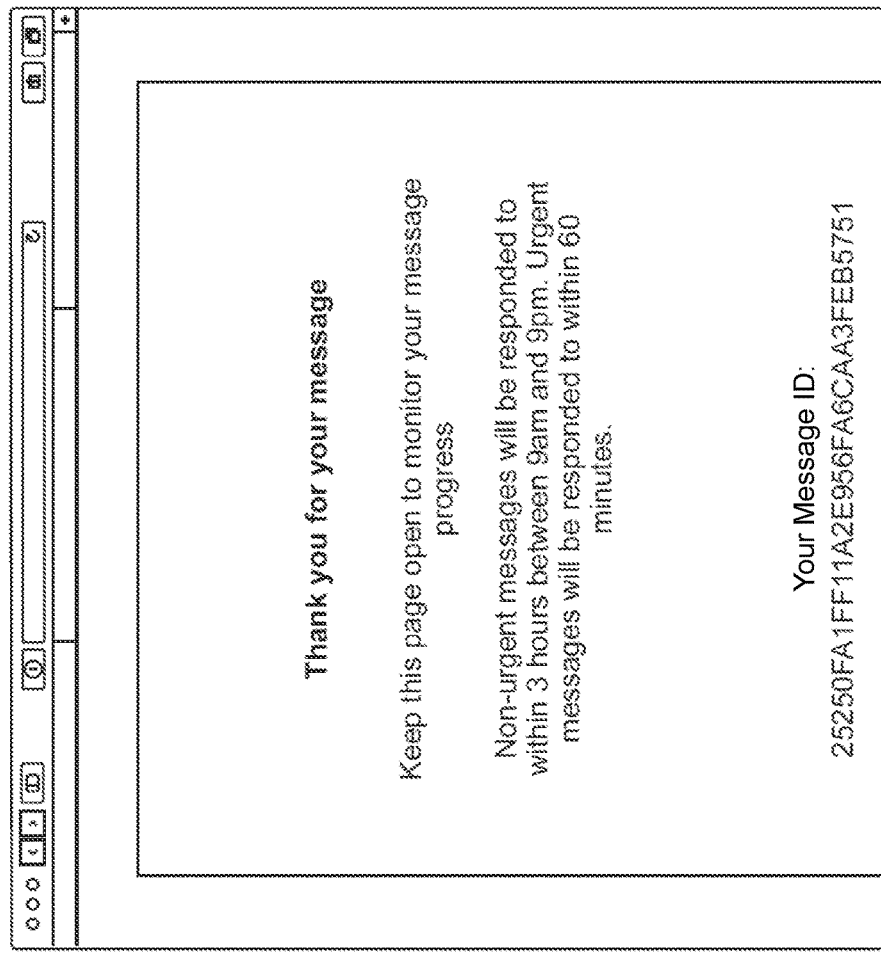
FIGS. 11A-11B illustrate GUI displays of a patient web browser and provider smart phone after a message has been sent by the requester and received by the provider, according to one embodiment.
Figure 11B:
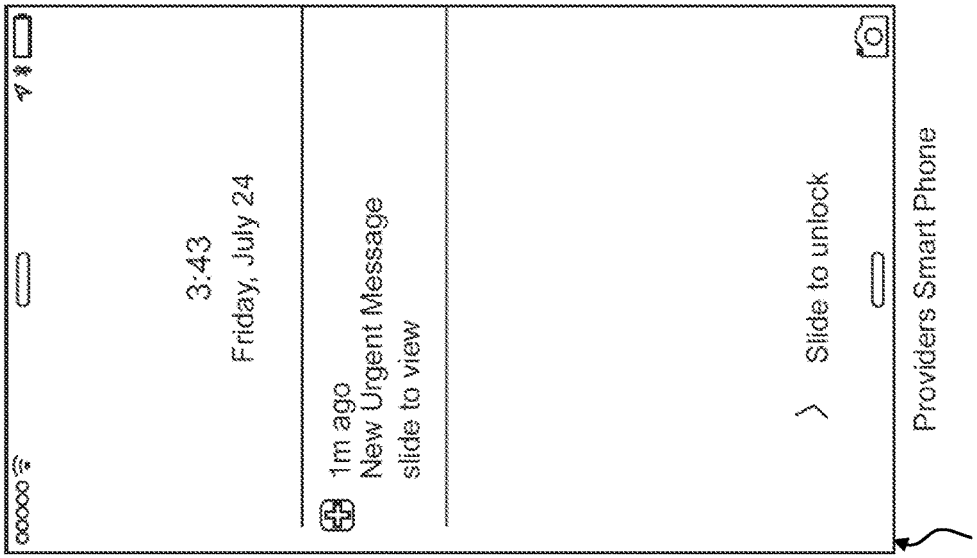

FIGS. 11A-11B illustrate GUI displays of a patient web browser 1000 and provider smart phone 1100 after a message has been sent by the requester and received by the provider. As soon as the requester submits the message or leaves a voicemail message, the Provider App will notify the Provider. The patient web browser will display a message progress and remind the requester to keep the web browser open in order to monitor the message progress. The Provider Client 300 can retrieve the message from the service module 60 or the Provider Client 90, as shown in FIG. 7. The Provider can be notified via the App, Text Message, or a Phone call. Depending on the urgency of the message, the provider may be notified of the message with a push notification and a tone or without a tone, as shown in FIG. 5. In some embodiments, the provider may be notified via voice services by a call leaving a message to check messages in the App, as shown in FIG. 5.

Figures 12A, 12B:
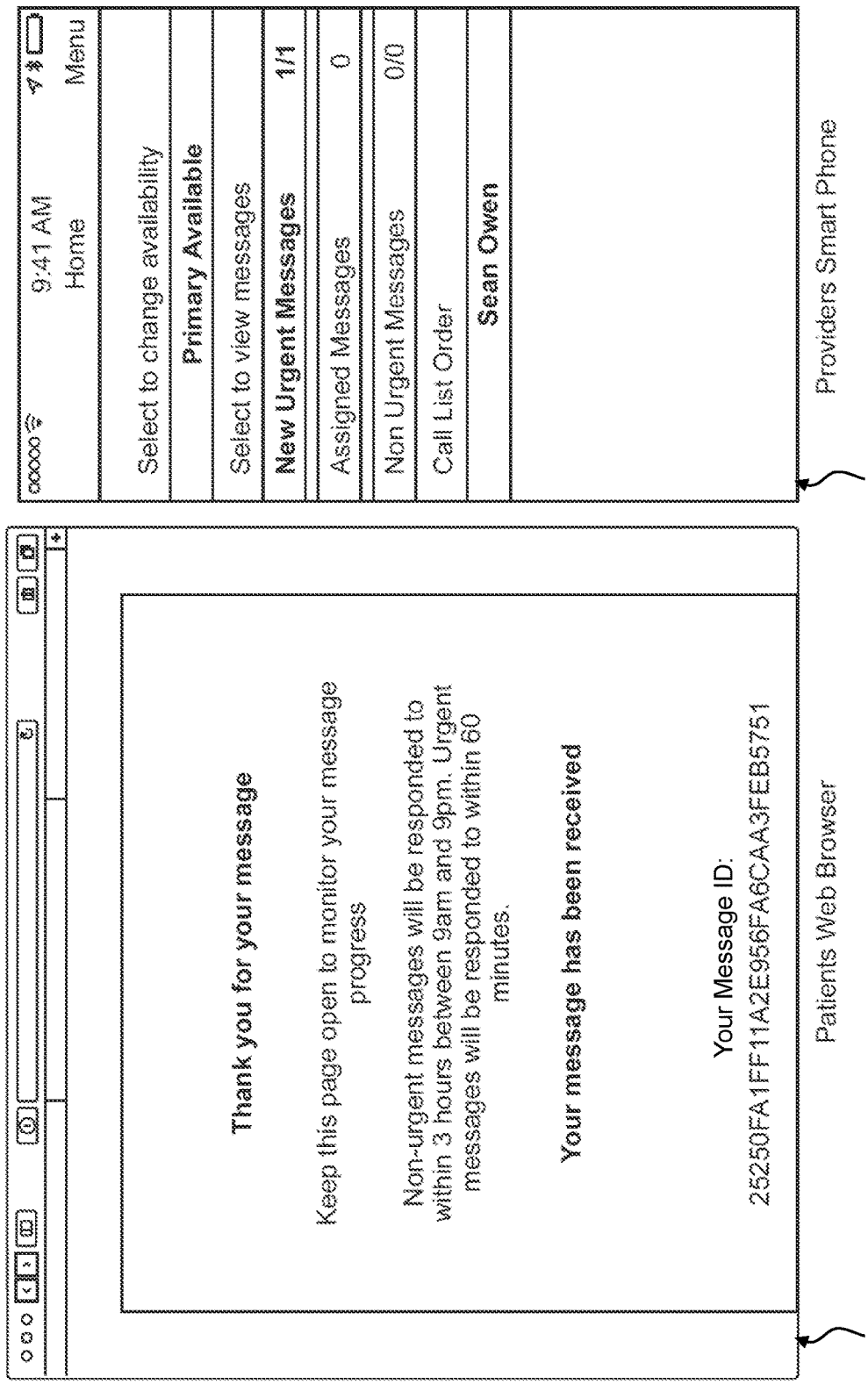
FIGS. 12A-12B illustrate a GUI display of a patient web browser and provider smart phone after a message has been sent by the requester and available to view on a dashboard of the provider, according to one embodiment.

FIGS. 12A-12B illustrate GUI displays of a patient web browser 1000 and provider smart phone 1100 after a message has been sent by the requester and available to view on a dashboard of the provider. The patient web browser continues to display the message to the requester to keep the page open in order to monitor message progress, as in FIG. 11A. The provider smart phone provides a dashboard that may be accessible to the provider after receiving a push notification, as shown in FIG. 11B, and swiping to access the dashboard. The provider dashboard may allow the provider to change their availability, view new urgent messages, view new non-urgent messages, and view or modify call list order. The provider dashboard may also display the name of the provider authenticated to the App in the smart phone.

FIGS. 13A-13B illustrate GUI displays of a patient web browser 1000 and provider smart phone 1100 after a message has been sent by the requester and viewed by the provider. The patient web browser may notify the requester that the message has been received (e.g., a message stating "Your message has been received") which allows the Requester to know the request is being handled, based on its urgency. The message is retrieved by the Provider Client 300, as in FIG. 7. The provider can read the contents of the message, which includes the information entered by the requester in FIG. 10. Opening the message, by selecting the message in the provider dashboard as in FIG. 12B, triggers the update to the requester as to the message status. The provider can see the details of the request, assign the task to a different provider, takes notes, and/or reply to the requester via a phone call or text message.

Figures 14A, 14B:
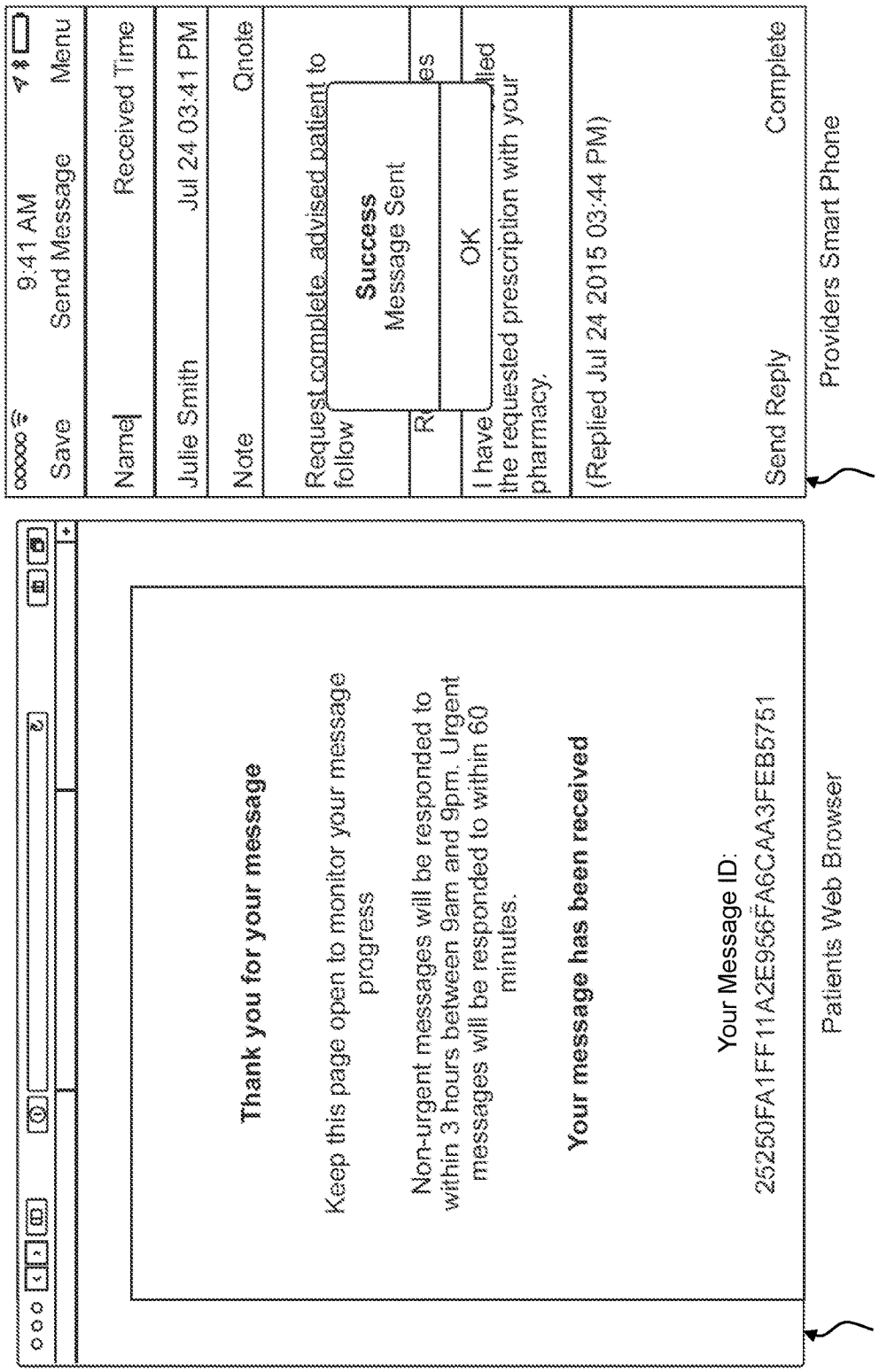
FIGS. 14A-14B illustrate a GUI display of a patient web browser and provider smart phone after a message has been sent by the requester and a reply has been sent by the provider, according to one embodiment.

FIGS. 14A-14B illustrate GUI displays of a patient web browser 1000 and provider smart phone 1100 after a message has been sent by the requester and a reply has been sent by the provider. The provider has entered a note for the patient record, and sent a reply to the requester via text message. The message sent success is confirmed to the provider (e.g., by a pop-up "Message Sent" window in the providers smart phone). Accordingly, the message, with the provider reply, is updated, as in FIG. 7.

Figure 14C:
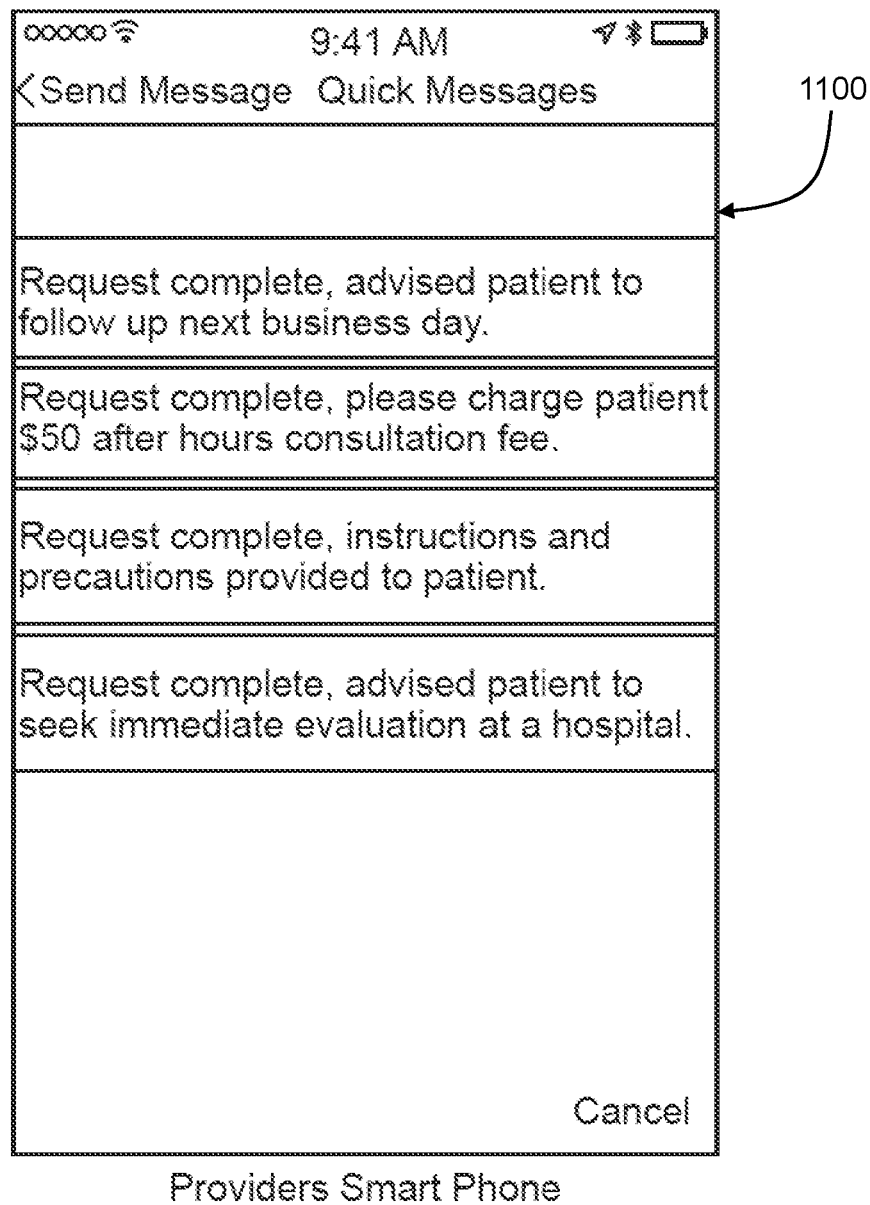
FIG. 14C illustrates a GUI of a provider smart phone showing a list of pre-determined responses that may be sent to a requester, according to one embodiment.

FIG. 14C illustrates a GUI display 1100 of a provider smart phone showing a list of pre-determined responses that may be sent to a requester. The Provider can select from pre-determined responses (e.g., quick messages) for the patient record or requester reply. These quick messages are often used and their availability on the providers smart phone speeds up the communication process and increases accuracy for common message replies.

Figure 14D:
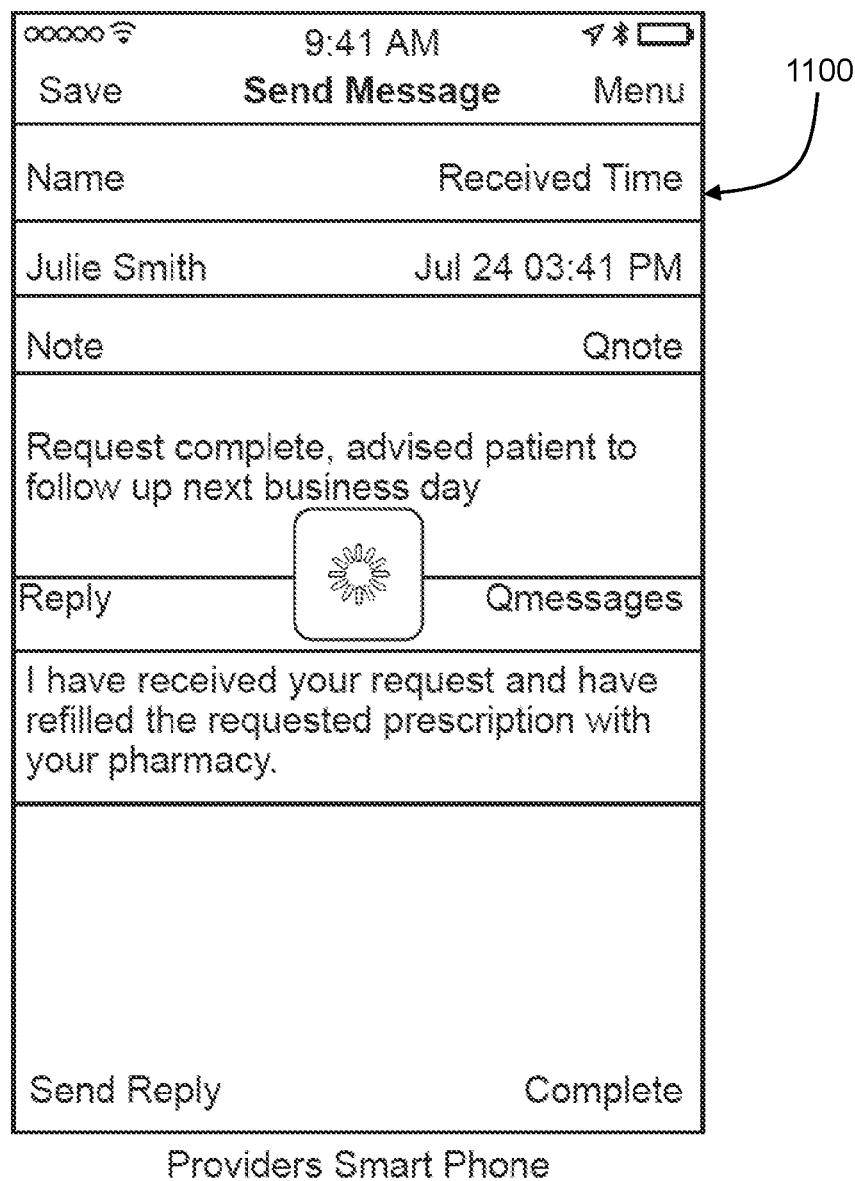
FIG. 14D illustrates a GUI of a provider smart phone as a provider reply is bent sent, according to one embodiment.

FIG. 14D illustrates a GUI display 1100 of a provider smart phone as a provider reply has been sent. The provider has entered a note for the patient record and typed a reply to the requester. When the provider completes (e.g., presses "Complete" and/or "Send Reply") the provider smart phone sends the message to the requester.

Figure 14E:
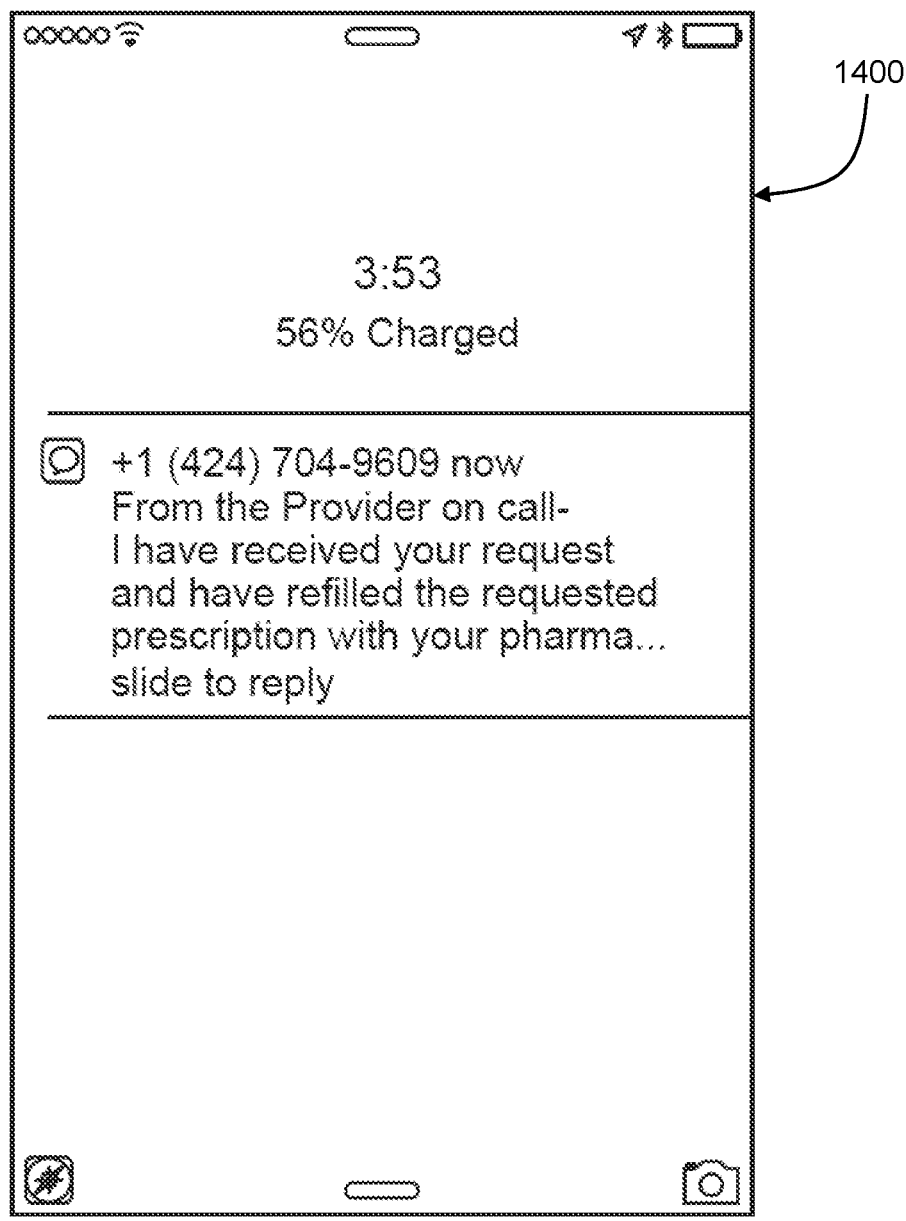
FIG. 14E illustrates a GUI of a patient's smart phone as a push notification is received regarding the message reply sent by the provider in FIG. 14D, according to one embodiment.

FIG. 14E illustrates a GUI display 1400 of a patients smart phone as a push notification is received regarding the message reply sent by the provider in FIG. 14D. When the provider sends the reply to the requester, the requester will get a text message. The text message is sent to the phone number entered by the requester, as shown in FIG. 10, and verified as a mobile text number to receive communications. By sliding, the requester may view the full message on their patient smart phone.

FIGS. 15A-15B illustrate GUI displays of a patients web browser 1000 and a patient smart phone 1400 showing that a message has been received by the provider. The patient web browser may show that a message has been received so that the patient may check the phone number the patient has provided in the request form, as shown in FIG. 10. On the patient smart phone, the patient may view the message from the provider and send any response, if necessary, to this received message.

FIGS. 16A-16B illustrate GUI displays of a patient web browser 1000 and a provider smart phone 1100 after the request has been completed. After the provider responds to the requester via phone or text message, the provider can complete the message which removes the message request from the provider device (e.g., provider smart phone no longer shows the message). The requester submission page is updated to confirm that the request has been completed and the interaction between the requester and provider is over (e.g., a message of "The Provider has completed your request.").

Figure 17A:
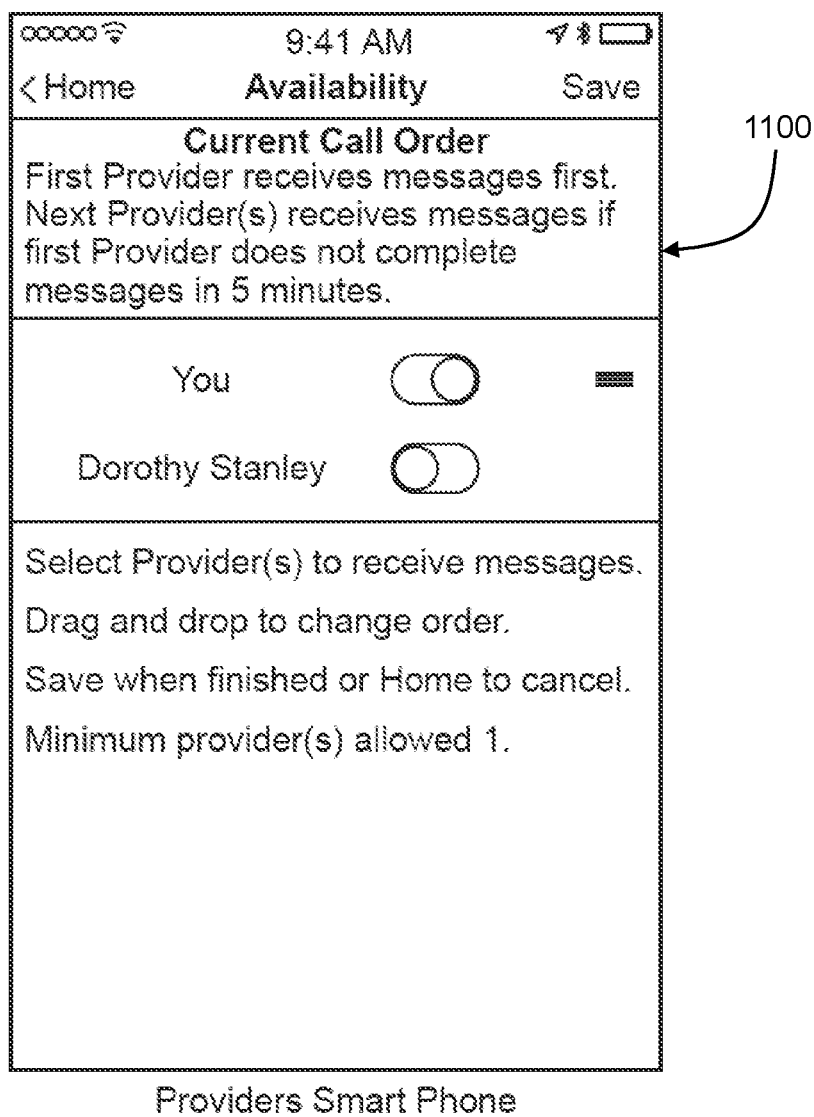
FIG. 17A illustrates a GUI of a provider smart phone showing a current call order, according to one embodiment.

FIG. 17A illustrates a GUI display of a provider smart phone 1100 showing a current call order. The primary provider can set who will be the backup provider in case the primary provider is not available, their device is not within network range, or there is an emergency and the primary provider cannot respond. The primary provider may select to activate one or more backup providers and order these backup providers (e.g., by drag and drop to change order). The backup provider will be made the primary provider after a defined time interval (e.g., if the primary provider does not complete a message response within five minutes).

Figure 17B:
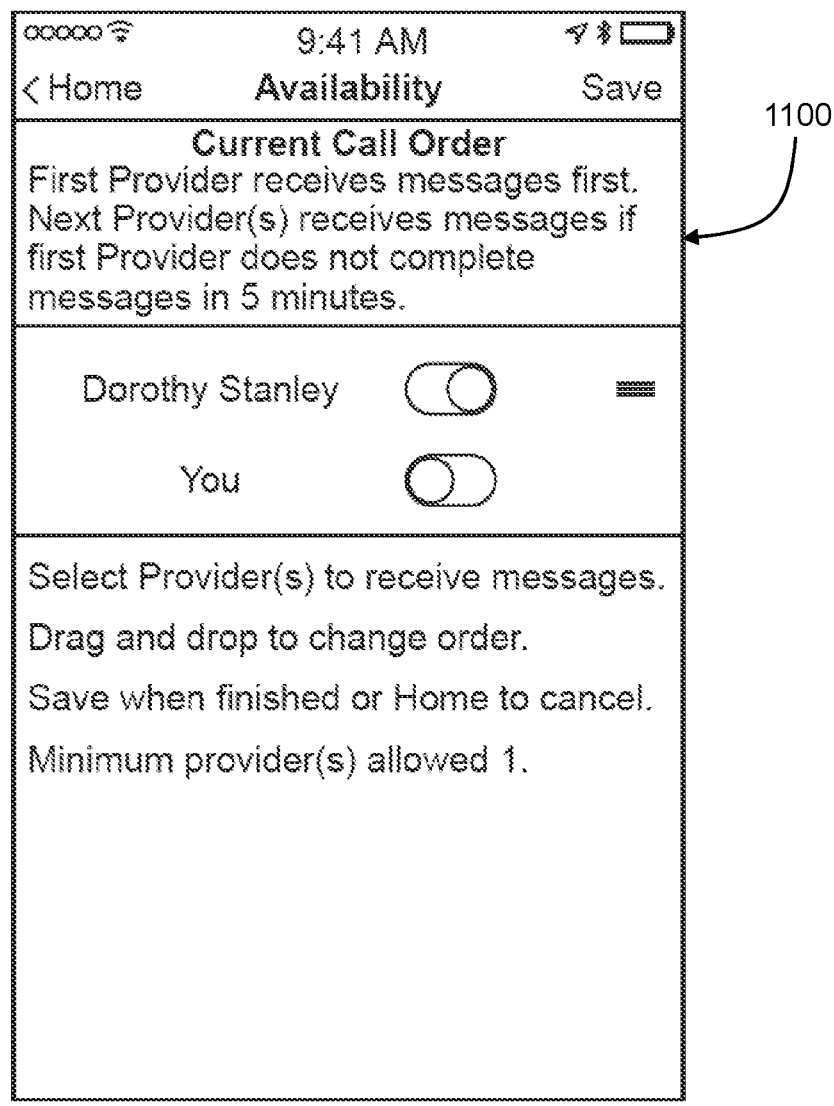
FIG. 17B illustrates a GUI of a provider smart phone showing a current call order. The backup provider, as shown in FIG. 17A, has been reordered to be the primary provider, according to one embodiment.

FIG. 17B illustrates a GUI display of a provider smart phone 1100 showing a current call order. The backup provider, as shown in FIG. 17A, has been reordered to be the primary provider. Accordingly, messages from a requester will first be sent to the new primary provider. If this new primary provider does not respond to messages within a set time frame (e.g., within five minutes), then the message will be sent to the next provider on the list, which may be the original primary provider.

Figure 17C:
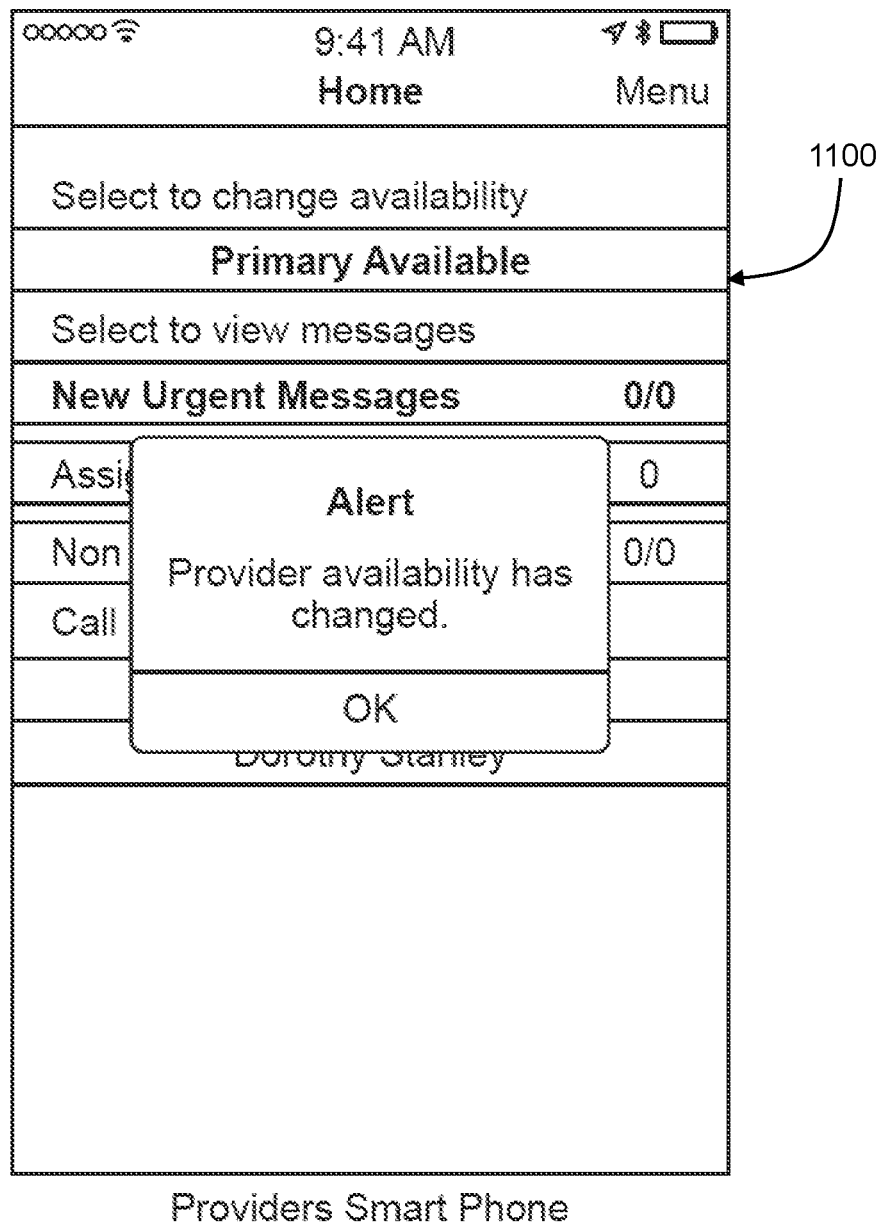
FIG. 17C illustrates a GUI of a provider smart phone showing an alert that provider availability has changed, according to one embodiment.

FIG. 17C illustrates a GUI display of a provider smart phone 1100 showing an alert that provider availability has changed. If provider availability has changed, as from FIG. 17A to 17B, the Providers who are made primary or secondary are notified of any change to the provider status (e.g., by a pop-up "Provider availability has changed" message), because they will have to be ready to answer messages from requesters.

Figure 18:
FIG. 18 illustrates a web browser view of the message list used by the provider or office staff. Messages can be marked as new, urgent, assigned, complete and cleared, according to one embodiment.

FIG. 18 illustrates a web browser view 1800 of the message list used by the provider or office staff. Messages can be marked as new, urgent, assigned, complete and cleared. New messages have not been read. Urgent messages alert the provider with an alert tone. Non-urgent messages alert the provider every 15-60 minutes. Assigned messages are those messages that have been assigned to a provider for special handling. Complete message are those where the interaction is complete. For complete messages, notes and replies have been sent and the record can no longer be changed. Cleared messages are moved into an archive state and the office staff no longer needs to be aware of the record, it has been transferred into the EHR. All messages may be retrieved or updated at the Provider Client 300, as shown in FIG. 7.

FIG. 19 illustrates a web browser view 1800 of the call order used by the provider or office staff. The provider or staff can change the call order for the providers through the web application. Call order may be displayed or updated at the Provider Client 300, as shown in FIG. 8A.

Figure 20:
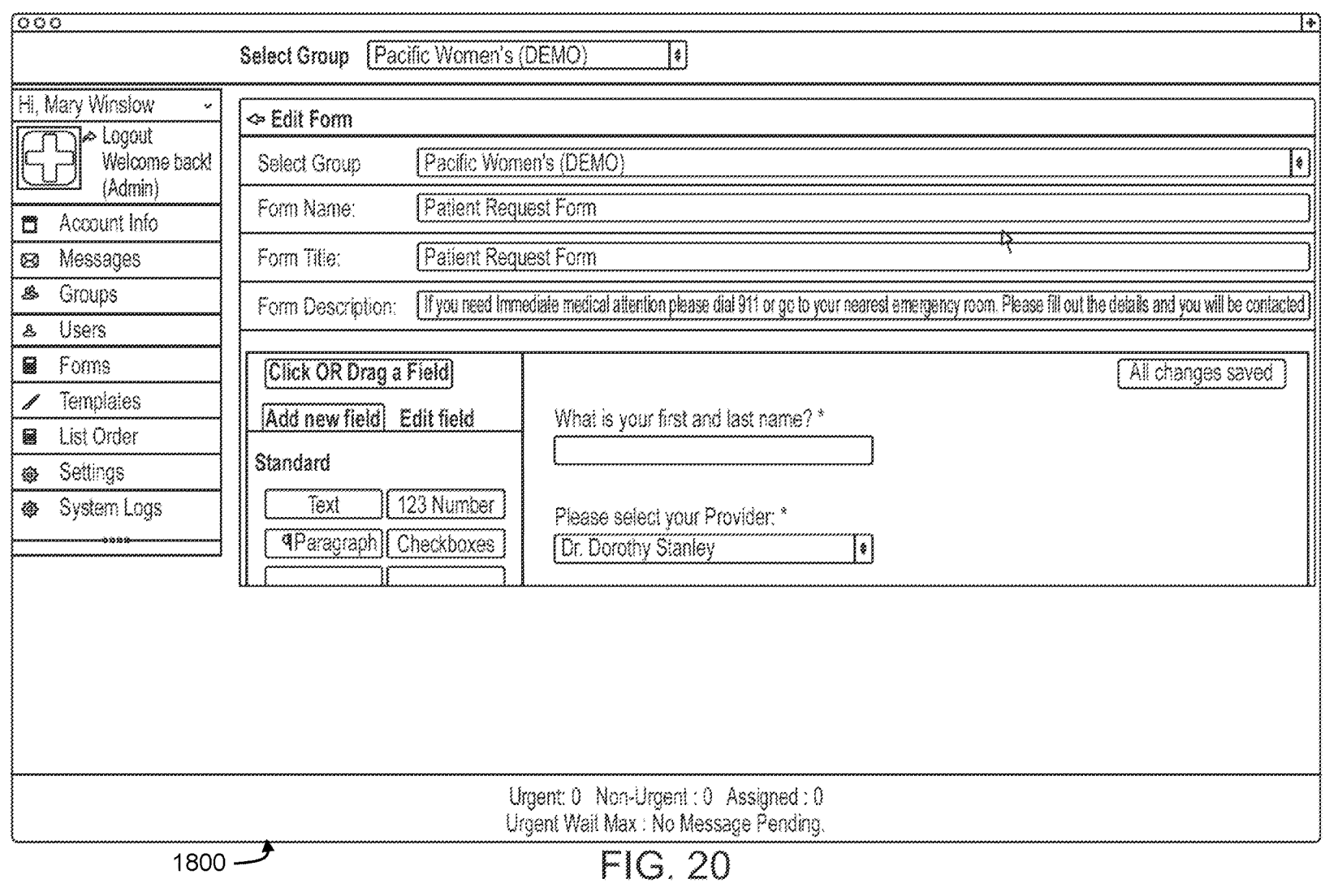

FIG. 20 illustrates a web browser view 1800 of form creation and form editing used by the provider or office staff. Each provider can build their own web forms, which allow them to specify exactly which criteria they wish to collect from requesters. The forms are then presented to the requester. Data from the forms can be collected from the requesters, as in FIG. 10. The providers are notified of messages from requesters based on the form criteria. Form fields may include a group selection, a form name, a form title, a form description, and a prompt for the requester name.

FIG. 21 illustrates a web browser view 1800 of group management used by the provider or office staff. The provider administrator can create accounts such as providers and staff to receive and process requests. The provider administrator may add, or delete, these accounts from selected groups.

Unlike the embodiments disclosed herein, conventional web sites that use email and chat require a live person be involved in the communication causing either no immediate reply or the inability for a service provider to respond appropriately to the number of incoming requests. Voicemail services often collect inaccurate data due to inaudible recordings or missing critical information do to human nature. Manual intervention is needed when providers do not respond to current methods of notification. Alternatively, live operator systems may not document accurately, create delays, require information to be repeated multiple times, and are costly. The experience for the user making the request is dissatisfaction because the timeliness or guarantee of a reply is not appropriate for the urgency of the request. The service provider is burdened with staffing appropriate personnel to monitor and respond to requests, which is not financially feasible. Accurate documentation and tracking of communication is not provided. There is no automatic method for the responder to hide or block their phone number in their communication back to the person in need.

Figure 22:
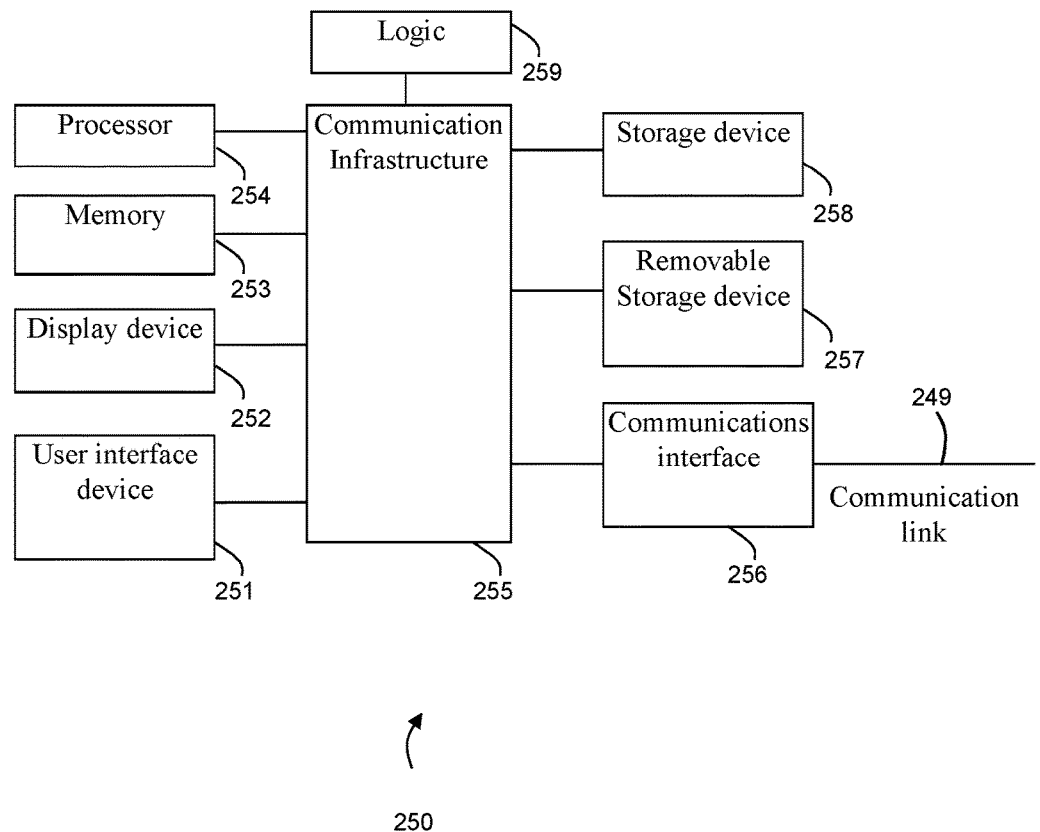
FIGS. 22-24 show example computer systems on which the notification system can be implemented.

FIG. 22 is a high level block diagram showing a computing system 250 comprising a computer system useful for implementing an embodiment of the notification system and process, disclosed herein. The computer system includes one or more processors 254, and can further include an electronic display device 252 (for displaying graphics, text, and other data), a main memory 253 (e.g., random access memory (RAM)), storage device 258, removable storage device 257 (e.g., removable storage drive, removable memory module, a magnetic tape drive, optical disk drive, computer readable medium having stored therein computer software and/or data), user interface device 251 (e.g., keyboard, touch screen, keypad, pointing device), a communication interface 256 (e.g., modem, a network interface (such as an Ethernet card), a communications port, or a PCMCIA slot and card), and logic module 259 with stored instructions for execution by the processor. The communication interface allows software and data to be transferred between the computer system and external devices. The system further includes a communications infrastructure (e.g., a communications bus, cross-over bar, or network) to which the aforementioned devices/modules are connected as shown. In one embodiment, the functions, processes and steps of the modules and blocks and GUIs shown in the figures and described herein can be implemented as logic blocks 259.

Information transferred via communications interface may be in the form of signals such as electronic, electromagnetic, optical, or other signals capable of being received by communications interface 256, via a communication link 249 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Embodiments can be implemented as computer implemented method or process, as disclosed herein. Embodiments can be implemented in digital electronic circuitry, or in computer hardware, firmware, software, or in combinations thereof. Apparatus/system of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Figure 23:
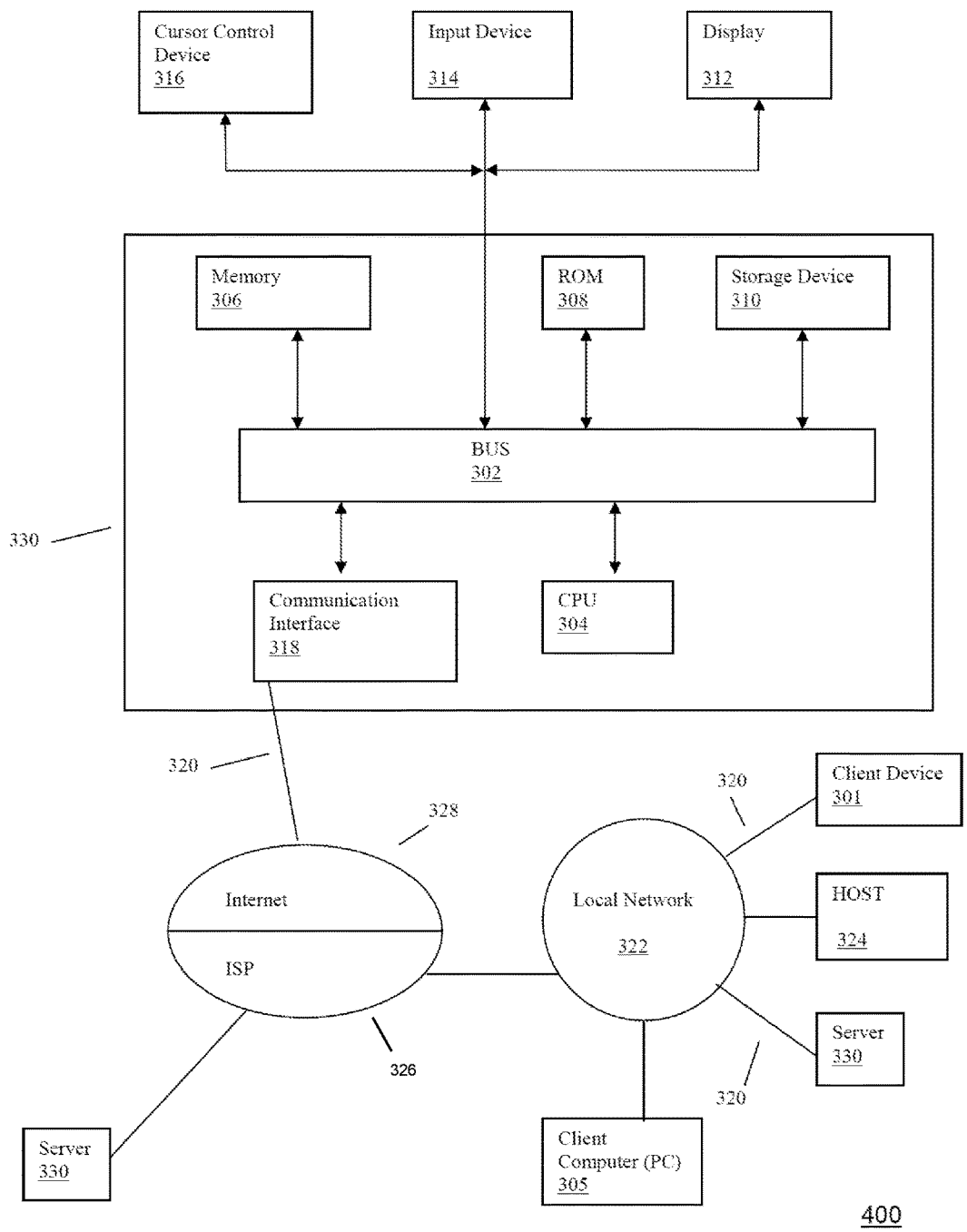

FIG. 23 shows a block diagram of an example system 400 in which an embodiment of the invention may be implemented. The system 400 includes one or more client devices 301 such as consumer electronics devices, connected to one or more server computing systems 330. A server 330 includes a bus 302 or other communication mechanism for communicating information, and a processor (CPU) 304 coupled with the bus 302 for processing information. The server 330 also includes a main memory 306, such as a random access memory (RAM) or other dynamic storage device, coupled to the bus 302 for storing information and instructions to be executed by the processor 304. The main memory 306 also may be used for storing temporary variables or other intermediate information during execution or instructions to be executed by the processor 304. The server computer system 330 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions. The bus 302 may contain, for example, thirty-two address lines for addressing video memory or main memory 306. The bus 302 can also include, for example, a 32-bit data bus for transferring data between and among the components, such as the CPU 304, the main memory 306, video memory and the storage 310. Alternatively, multiplex data/address lines may be used instead of separate data and address lines.

The server 330 may be coupled via the bus 302 to a display 312 for displaying information to a computer user. An input device 314, including alphanumeric and other keys, is coupled to the bus 302 for communicating information and command selections to the processor 304. Another type or user input device comprises cursor control 316, such as a mouse, a trackball, or cursor direction keys for communicating direction information and command selections to the processor 304 and for controlling cursor movement on the display 312.

According to one embodiment of the invention, the functions of the invention are performed by the processor 304 executing one or more sequences of one or more instructions contained in the main memory 306. Such instructions may be read into the main memory 306 from another computer-readable medium, such as the storage device 310. Execution of the sequences of instructions contained in the main memory 306 causes the processor 304 to perform the process steps described herein. One or more processors in a multi-processing arrangement may also be employed to execute the sequences of instructions contained in the main memory 306. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 304 for execution. Such a medium may take many forms, including but not limited to, non-volatile media, volatile media, and transmission media. Non-volatile media includes, for example, optical or magnetic disks, such as the storage device 310. Volatile media includes dynamic memory, such as the main memory 306.

Transmission media includes coaxial cables, copper wire and fiber optics, including the wires that comprise the bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the server 330 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

The server 330 also includes a communication interface 318 coupled to the bus 302. The communication interface 318 provides a two-way data communication coupling to a network link 320 that is connected to the world wide packet data communication network now commonly referred to as the Internet 328. The Internet 328 uses electrical, electromagnetic or optical signals that carry digital data streams. The signals through the various networks and the signals on the network link 320 and through the communication interface 318, which carry the digital data to and from the server 330, are exemplary forms or carrier waves transporting the information.

In another embodiment of the server 330, interface 318 is connected to a network 322 via a communication link 320. For example, the communication interface 318 may be an integrated services digital network (ISDN) card or a modem to provide a data communication connection to a corresponding type of telephone line, which can comprise part of the network link 320. As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information.

The network link 320 typically provides data communication through one or more networks to other data devices. For example, the network link 320 may provide a connection through the local network 322 to a host computer 324 or to data equipment operated by an Internet Service Provider (ISP) 326. The ISP 326 in turn provides data communication services through the Internet 328. The local network 322 and the Internet 328 both use electrical, electromagnetic or optical signals that carry digital data streams. The signals through the various networks and the signals on the network link 320 and through the communication interface 318, which carry the digital data to and from the server 330, are exemplary forms or carrier waves transporting the information.

The server 330 can send/receive messages and data, including e-mail, program code, through the network, the network link 320 and the communication interface 318. Further, the communication interface 318 can comprise a USB/Tuner and the network link 320 may be an antenna or cable for connecting the server 330 to a cable provider, satellite provider or other terrestrial transmission system for receiving messages, data and program code from another source.

The example versions of the invention described herein may be implemented as logical operations in a distributed processing system such as the system 400 including the servers 330. The logical operations of the present invention may be implemented as a sequence of steps executing in the server 330, and as interconnected machine modules within the system 400. The implementation is a matter of choice and can depend on performance of the system 400 implementing the invention. As such, the logical operations constituting said example versions of the invention are referred to for e.g., as operations, steps or modules.

Similar to a server 330 described above, a client device 301 can include a processor, memory, storage device, display, input device and communication interface (e.g., e-mail interface) for connecting the client device to the Internet 328, the ISP 326, or LAN 322, for communication with the servers 330.

The system 400 can further include computers (e.g., personal computers, computing nodes) 305 operating in the same manner as client devices 301, wherein a user can utilize one or more computers 305 to manage data in the server 330.

FIG. 24 shows a block diagram of another example computing system 260, such as a cloud computing environment, in which an embodiment of the invention may be implemented. The system 260 comprises a cloud-based infrastructure 261, which can be accessed (e.g., by a requester 100 and/or provider 300) via an internet gateway 264, using a web browser 265, and application such as mobile application 266, and/or voice service 267 such as VoIP telephony service. The cloud computing infrastructure 261 includes one or more processors (CPU), RAM, disk drive, network interface, data base, etc. An example cloud computing infrastructure 261 includes web application server 262, web traffic load balancer 263 and a database 268, utilizing which the service module 200, disclosed herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though embodiments have been described with reference to certain versions thereof; however, other versions are possible. Therefore, the spirit and scope of the embodiments should not be limited to the description of the preferred versions contained herein.

What is claimed is:

1. A computer implemented method comprising:
   receiving, from a requester device of a user patient, a request at a message device having a processor and a messaging service module to process requests;
   generating at the messaging service module, a request message based on the request;
   determining, at the messaging service module, a first provider entity that is set as a primary provider entity to service the request message in an availability list that comprises the first provider entity and a second provider entity that is available to service the request message; and
   transmitting from the messaging service module, a notification of the request message to a first provider device associated with the first provider entity;
   in response to an indication that the first provider device did not receive, or respond to, the notification within a time period set based on an urgency level of the request message:
      promoting the second provider entity to the primary provider entity in the availability list;
      transmitting, from the messaging service module, the notification to a second provider device associated with the second provider entity that is promoted to the primary provider entity in the availability list;
   in response to an indication that the second provider device did not receive, or respond to, the notification within a second time period based on the urgency level of the request message;
      promoting the first provider entity to the primary provider entity in the availability list; and
      transmitting, from the messaging service module, the notification to the first provider device associated with the first provider entity that is promoted to the primary provider entity in the availability list.

2. The computer implemented method of claim 1, further comprising:
   in response to an indication that the first provider device received the notification within the time period:
      transmitting, by the messaging service module, the request message to the first provider device;
      receiving, from the first provider device, a reply message; and
      transmitting, by the messaging service module, the reply message to the requester device.

3. The computer implemented method of claim 2, wherein the reply message comprises one or more: a Short Message Service (SMS) text message, or a call to the requester device.

4. The computer implemented method of claim 1, wherein the request comprises patient data entered by the user patient via a web form presented on the requester device, the patient data comprising one or more attributes of the user patient and one or more content.

5. The computer implemented method of claim 4, wherein the one or more attributes of the user patient include one or more of a user patient location, a user patient profile, a user patient phone number, a user patient name, or a user patient date of birth.

6. The computer implemented method of claim 1, wherein the transmitted notification comprises one or more of: a Short Message Sendee (SMS) text message, or a call playing a pre-recorded message.

7. The computer implemented method of claim 1, further comprising:
   in response to an indication that the second provider device received the notification within the second time period:
      transmitting, by the messaging service module, the request message to the second provider device;
      receiving, from the second provider device, a reply message; and
      transmitting, by the messaging service module, the reply message to the requester device.

8. The computer implemented method of claim 1 wherein, in response to the indication that the first provider device received the notification within the time period:
   transmitting from the messaging service module, the request message to one or more external service provider devices, wherein the one or more external service provider devices are subscribed to the request.

9. The computer implemented method of claim 1, further comprising:
   retrieving additional information related to the user patient from one or more data sources, wherein the additional information comprises location data of the user patient and user patient history; and
   augmenting the request message with the additional information.

10. The computer implemented method of claim 1, wherein, in response to the indication that the first provider device did not receive, or respond to, the notification within the time period:
   transmitting, from the messaging service module, the request message to one or more external service provider devices, wherein the one or more external service provider devices are subscribed to the request.

11. The computer implemented method of claim 1, further comprising:
in response to promoting the second provider entity to the primary provider entity in the availability list, transmitting an update related to the availability list to each provider device associated with each provider entity in the availability list, wherein the update causes each provider device to retrieve the availability list.

* * * * *